US009491743B2

(12) United States Patent
Yang et al.

(10) Patent No.: US 9,491,743 B2
(45) Date of Patent: Nov. 8, 2016

(54) METHOD FOR TRANSMITTING CONTROL INFORMATION AND APPARATUS FOR SAME

(75) Inventors: Suckchel Yang, Anyang (KR); Mingyu Kim, Anyang (KR); Seunghee Han, Anyang (KR); Hyunwoo Lee, Anyang (KR)

(73) Assignee: LG ELECTRONICS INC., Seoul (KR)

( * ) Notice: Subject to any disclaimer, the term of this patent is extended or adjusted under 35 U.S.C. 154(b) by 192 days.

(21) Appl. No.: 13/878,970

(22) PCT Filed: Oct. 11, 2011

(86) PCT No.: PCT/KR2011/007521
§ 371 (c)(1),
(2), (4) Date: Apr. 11, 2013

(87) PCT Pub. No.: WO2012/050340
PCT Pub. Date: Apr. 19, 2012

(65) Prior Publication Data
US 2013/0208691 A1    Aug. 15, 2013

Related U.S. Application Data

(60) Provisional application No. 61/392,023, filed on Oct. 11, 2010, provisional application No. 61/392,483, filed on Oct. 13, 2010, provisional application No. 61/392,935, filed on Oct. 13, 2010, provisional application No. 61/393,310, filed on Oct. 14, 2010.

(51) Int. Cl.
*H04W 4/00*    (2009.01)
*H04W 72/04*    (2009.01)
(Continued)

(52) U.S. Cl.
CPC ........ *H04W 72/0413* (2013.01); *H04L 1/0029* (2013.01); *H04L 1/1812* (2013.01);
(Continued)

(58) Field of Classification Search
None
See application file for complete search history.

(56) References Cited

U.S. PATENT DOCUMENTS 8,670,410 B2 *  3/2014  Luo ................. H04L 1/1607
                                                370/331
8,792,427 B2 *  7/2014  Damnjanovic ....... H04L 1/0028
                                                370/329
(Continued)

FOREIGN PATENT DOCUMENTS

WO    2011/049354    4/2011
WO    2011/140002    11/2011

OTHER PUBLICATIONS

Pantech, "UL PUCCH A/N resource allocation for CA," 3GPP TSG RAN1 #62, R1- 104632, Aug. 2010, 4 pages.
(Continued)

*Primary Examiner* — Marsha D Banks Harold
*Assistant Examiner* — Christopher Wyllie
(74) *Attorney, Agent, or Firm* — Lee, Hong, Degerman, Kang & Walmey; Jonathan Kang; Michael Monaco

(57) ABSTRACT

The present invention pertains to a wireless communication system. Particularly, the present invention relates to a method for transmitting uplink control information and an apparatus for the same, wherein the method comprises the steps of: selecting one uplink control channel resource corresponding to a plurality of HARQ-ACKs, from a plurality of uplink control channel resources; and transmitting a bit value corresponding to the plurality of HARQ-ACKs through the use of the selected uplink control channel resource.

4 Claims, 15 Drawing Sheets

(51) Int. Cl.
*H04L 1/00* (2006.01)
*H04L 1/18* (2006.01)
*H04L 5/00* (2006.01)
*H04L 1/06* (2006.01)
*H04L 1/16* (2006.01)

(52) U.S. Cl.
CPC ........... *H04L1/1854* (2013.01); *H04L 1/1861* (2013.01); *H04L 5/0053* (2013.01); *H04L 5/0055* (2013.01); *H04L 5/0094* (2013.01); *H04L 1/0026* (2013.01); *H04L 1/0061* (2013.01); *H04L 1/06* (2013.01); *H04L 1/1671* (2013.01); *H04L 5/0023* (2013.01)

(56) References Cited

U.S. PATENT DOCUMENTS

| | | | | |
|---|---|---|---|---|
| 8,976,738 | B2* | 3/2015 | Berggren | H04L 1/0073 370/328 |
| 8,976,754 | B2* | 3/2015 | Berggren | H04L 1/1692 370/329 |
| 2011/0090825 | A1* | 4/2011 | Papasakellariou | H04L 1/06 370/280 |
| 2011/0243066 | A1* | 10/2011 | Nayeb Nazar | H04L 1/007 370/328 |
| 2011/0268001 | A1* | 11/2011 | Lee | H04L 5/0005 370/311 |
| 2012/0039275 | A1* | 2/2012 | Chen | H04L 1/1607 370/329 |
| 2012/0039280 | A1* | 2/2012 | Chen | H04L 1/1861 370/329 |
| 2012/0039342 | A1* | 2/2012 | Berggren | H04L 1/0073 370/474 |
| 2012/0082263 | A1* | 4/2012 | Ebrahimi Tazeh Mahalleh | H04B 7/0669 375/299 |
| 2012/0087254 | A1* | 4/2012 | Yin | H04L 1/0031 370/252 |
| 2012/0113831 | A1* | 5/2012 | Pelletier | H04L 5/0058 370/252 |
| 2012/0113913 | A1* | 5/2012 | Tiirola | H04L 1/16 370/329 |
| 2012/0113944 | A1* | 5/2012 | Yang | H04L 1/1861 370/329 |
| 2012/0269103 | A1* | 10/2012 | Papasakellariou | H04L 1/1614 370/280 |
| 2012/0294273 | A1* | 11/2012 | Ahn | H04L 1/0028 370/329 |
| 2013/0039288 | A1* | 2/2013 | Ebrahimi Tazeh Mahalleh | H04B 7/02 370/329 |
| 2013/0044667 | A1* | 2/2013 | Han | H04L 1/0025 370/311 |
| 2013/0094410 | A1* | 4/2013 | Yang | H04L 1/1854 370/280 |
| 2013/0114479 | A1* | 5/2013 | Seo | H04L 1/1607 370/281 |
| 2013/0148610 | A1* | 6/2013 | Berggren | H04L 1/1692 370/329 |
| 2013/0170463 | A1* | 7/2013 | Yang | H04L 1/1861 370/329 |
| 2013/0176929 | A1* | 7/2013 | Yang | H04L 1/1861 370/311 |
| 2013/0188592 | A1* | 7/2013 | Yang | H04L 5/00 370/329 |
| 2013/0208691 | A1* | 8/2013 | Yang | H04L 1/0029 370/329 |
| 2013/0242923 | A1* | 9/2013 | Yang | H04L 1/1825 370/329 |
| 2013/0322304 | A1* | 12/2013 | Yang | H04W 72/042 370/280 |
| 2014/0003302 | A1* | 1/2014 | Han | H04W 28/08 370/280 |
| 2014/0022967 | A1* | 1/2014 | Yang | H04L 1/1861 370/280 |
| 2014/0056184 | A1* | 2/2014 | Yang | H04L 5/001 370/280 |
| 2014/0078944 | A1* | 3/2014 | Yang | H04L 5/001 370/280 |
| 2014/0169242 | A1* | 6/2014 | Yang | H04L 1/18 370/280 |
| 2015/0036603 | A1* | 2/2015 | Yang | H04L 5/001 370/329 |
| 2015/0103705 | A1* | 4/2015 | Yang | H04L 1/1861 370/280 |

OTHER PUBLICATIONS

Samsung, "UL HARQ-ACK Multiplexing: Mapping for 4 Bits," 3GPP TSG RAN WG1 #62, R1-104577, Aug. 2010, 3 pages.
Fujitsu, "Channel Selection for A/N feedback in CA," 3GPP TSG-RAN1 #62, R1-104875, Aug. 2010, 5 pages.
Samsung, "PUCCH HARQ-ACK Resource Mapping for DL CA," 3GPP TSG RAN WG1 #61bis, R1-103637, Jun. 2010, 3 pages.
PCT International Application No. PCT/KR2011/007521, Written Opinion of The International Searching Authority dated Apr. 19, 2012, 16 pages.
Panasonic, "Mapping Tables for Format 1b with Channel Selection," 3GPP TSG RAN WG1 Meeting #62bis, R1-105476, Oct. 2010, 7 pages.

* cited by examiner

FIG. 10

| SDM Cell | non-SDM Cell | PUCCH RESOURCE | | |
|---|---|---|---|---|
| | | 0 | 1 | 2 |
| A, A | A | | -1 | |
| A, N | A | | j | |
| N, A | A | | -j | |
| N, N | A | | | -1 |
| A, A | N | -1 | | |
| A, N | N | j | | |
| N, A | N | -j | | |
| N, N | N | | | 1 |
| A, A | D | -1 | | |
| A, N | D | j | | |
| N, A | D | -j | | |
| N, N | D | 1 | | |
| D, D | A | | | -1 |
| D, D | N | | | 1 |
| D, D | D | NO TRANSMISSION | | |

FIG. 12

| PCell | SCell | PUCCH RESOURCE | | | |
|---|---|---|---|---|---|
| | | 0 | 1 | 2 | 3 |
| A, A | A, A | | -1 | | |
| A, N | A, A | | | -j | |
| N, A | A, A | | -j | | |
| N, N | A, A | | | | -1 |
| A, A | A, N | | j | | |
| A, N | A, N | | | 1 | |
| N, A | A, N | | 1 | | |
| N, N | A, N | | | | j |
| A, A | N, A | | | -1 | |
| A, N | N, A | | | j | |
| N, A | N, A | | | | -j |
| N, N | N, A | | | | 1 |
| A, A | N, N | -1 | | | |
| A, N | N, N | j | | | |
| N, A | N, N | -j | | | |
| N, N | N, N | 1 | | | |
| A, A | D, D | -1 | | | |
| A, N | D, D | j | | | |
| N, A | D, D | -j | | | |
| N, N | D, D | 1 | | | |
| D, D | A, A | | | | -1 |
| D, D | A, N | | | | j |
| D, D | N, A | | | | 1 |
| D, D | N, N | NO TRANSMISSION | | | |
| D, D | D, D | NO TRANSMISSION | | | |

FIG. 13

| SDM Cell | | non-SDM Cell | PUCCH RESOURCE | | |
|---|---|---|---|---|---|
| PCell | SCell # 1 | SCell # 2 | 0 | 1 | 2 |
| HARQ - ACK (0) | HARQ - ACK (1) | HARQ - ACK (2) | | | |
| A, A | | A | | -1 | |
| A, N/D | | A | | j | |
| N/D, A | | A | | -j | |
| N/D, N/D | | A | | | -1 |
| A, A | | N | -1 | | |
| A, N/D | | N | j | | |
| N/D, A | | N | -j | | |
| N/D, N/D | | N | | | 1 |
| A, A | | D | -1 | | |
| A, N/D | | D | j | | |
| N/D, A | | D | -j | | |
| N, N | | D | 1 | | |
| N, D | | D | 1 | | |
| D, N | | D | 1 | | |
| D, D | | D | NO TRANSMISSION | | |

FIG. 14

| SDM PCell | | SDM SCell | | PUCCH RESOURCE | | | |
|---|---|---|---|---|---|---|---|
| SDM PCell | | SCell #1 | SCell #2 | | | | |
| PCell | SCell #1 | SCell #2 | SCell #3 | 0 | 1 | 2 | 3 |
| HARQ-ACK (0) | HARQ-ACK (1) | HARQ-ACK (2) | HARQ-ACK (3) | | | | |
| A, A | | A, A | | | -1 | | |
| A, N/D | | A, A | | | | -j | |
| N/D, A | | A, A | | | -j | | |
| N/D, N/D | | A, A | | | | | -1 |
| A, A | | A, N/D | | | j | | |
| A, N/D | | A, N/D | | | | 1 | |
| N/D, A | | A, N/D | | | 1 | | |
| N/D, N/D | | A, N/D | | | | | j |
| A, A | | N/D, A | | | -1 | | |
| A, N/D | | N/D, A | | | j | | |
| N/D, A | | N/D, A | | | | | -j |
| N/D, N/D | | N/D, A | | | | | 1 |
| A, A | | N/D, N/D | | -1 | | | |
| A, N/D | | N/D, N/D | | j | | | |
| N/D, A | | N/D, N/D | | -j | | | |
| N, D | | N/D, N/D | | 1 | | | |
| D, N | | N/D, N/D | | 1 | | | |
| N, N | | N/D, N/D | | 1 | | | |
| D, D | | N/D, N/D | | NO TRANSMISSION | | | |

METHOD FOR TRANSMITTING CONTROL INFORMATION AND APPARATUS FOR SAME

CROSS-REFERENCE TO RELATED APPLICATIONS

This application is the National Stage filing under 35 U.S.C. 371 of International Application No. PCT/KR2011/007521, filed on Oct. 11, 2011, which claims the benefit of U.S. Provisional Application Ser. No. 61/392,023, filed on Oct. 11, 2010, U.S. Provisional Application Ser. No. 61/392,483, filed on Oct. 13, 2010, U.S. Provisional Application Ser. No. 61/392,935, filed on Oct. 13, 2010, and U.S. Provisional Application Ser. No. 61/393,310, filed on Oct. 14, 2010, the contents of which are all hereby incorporated by reference herein in their entirety.

TECHNICAL FIELD

The present invention relates to a wireless communication system, and more particularly, to a method for transmitting control information and an apparatus for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method for transmitting uplink control information and an apparatus for the same in a wireless communication system. Another object of the present invention is to provide a method for efficiently transmitting control information, preferably, ACK/NACK information in a multicarrier situation and an apparatus for the same.

It will be appreciated by persons skilled in the art that the objects that could be achieved with the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for transmitting uplink control information when a plurality of cells including a primary cell and a secondary cell is configured in a wireless communication system, the method including: selecting one PUCCH (Physical Uplink Control Channel) resource corresponding to a plurality of HARQ-ACKs (Hybrid Automatic Repeat request-Acknowledgements), from a plurality of PUCCH resources for PUCCH format 1b; and transmitting bit values corresponding to the plurality of HARQ-ACKs using the selected PUCCH resource, wherein the plurality of HARQ-ACKs, the PUCCH resource and the bit values have the relationship shown in Table 1

TABLE 1

| HARQ-ACK(0) | HARQ-ACK(1) | HARQ-ACK(2) | HARQ-ACK(3) | $n_{PUCCH,i}^{(1)}$ | b(0)b(1) |
|---|---|---|---|---|---|
| ACK | ACK | ACK | ACK | $n_{PUCCH,1}^{(1)}$ | 1, 1 |
| ACK | NACK/DTX | ACK | ACK | $n_{PUCCH,2}^{(1)}$ | 0, 1 |
| NACK/DTX | ACK | ACK | ACK | $n_{PUCCH,1}^{(1)}$ | 0, 1 |
| NACK/DTX | NACK/DTX | ACK | ACK | $n_{PUCCH,3}^{(1)}$ | 1, 1 |
| ACK | ACK | ACK | NACK/DTX | $n_{PUCCH,1}^{(1)}$ | 1, 0 |
| ACK | NACK/DTX | ACK | NACK/DTX | $n_{PUCCH,2}^{(1)}$ | 0, 0 |
| NACK/DTX | ACK | ACK | NACK/DTX | $n_{PUCCH,1}^{(1)}$ | 0, 0 |
| NACK/DTX | NACK/DTX | ACK | NACK/DTX | $n_{PUCCH,3}^{(1)}$ | 1, 0 |
| ACK | ACK | NACK/DTX | ACK | $n_{PUCCH,2}^{(1)}$ | 1, 1 |
| ACK | NACK/DTX | NACK/DTX | ACK | $n_{PUCCH,2}^{(1)}$ | 1, 0 |
| NACK/DTX | ACK | NACK/DTX | ACK | $n_{PUCCH,3}^{(1)}$ | 0, 1 |
| NACK/DTX | NACK/DTX | NACK/DTX | ACK | $n_{PUCCH,3}^{(1)}$ | 0, 0 |
| ACK | ACK | NACK/DTX | NACK/DTX | $n_{PUCCH,0}^{(1)}$ | 1, 1 |
| ACK | NACK/DTX | NACK/DTX | NACK/DTX | $n_{PUCCH,0}^{(1)}$ | 1, 0 |
| NACK/DTX | ACK | NACK/DTX | NACK/DTX | $n_{PUCCH,0}^{(1)}$ | 0, 1 |
| NACK/DTX | NACK | NACK/DTX | NACK/DTX | $n_{PUCCH,0}^{(1)}$ | 0, 0 |
| NACK | NACK/DTX | NACK/DTX | NACK/DTX | $n_{PUCCH,0}^{(1)}$ | 0, 0 |
| DTX | DTX | NACK/DTX | NACK/DTX | No transmission | | herein HARQ-ACK(0) and (1) denote ACK/NACK/DTX responses to transport blocks of the primary cell, HARQ-ACK(2) and (3) denote ACK/NACK/DTX responses to transport blocks of the secondary cell, $n_{PUCCH,i}^{(1)}$ (i = 0, 1, 2, 3) represents a plurality of PUCCH resources for PUCCH format 1b, and b(0)b(1) represents the bit values.

In another aspect of the present invention, provided herein is a communication apparatus configured to transmit uplink control information when a plurality of cells including a primary cell and a secondary cell is configured in a wireless communication system, the communication apparatus including: an RF unit; and a processor, wherein the processor is configured to select one PUCCH (Physical Uplink Control Channel) resource corresponding to a plurality of HARQ-ACKs (Hybrid Automatic Repeat request-Acknowledgements), from a plurality of PUCCH resources for PUCCH format 1b and to transmit bit values corresponding to the plurality of HARQ-ACKs using the selected PUCCH resource, wherein the plurality of HARQ-ACKs, the PUCCH resource and the bit values have the relationship of Table 1

TABLE 1

| HARQ-ACK(0) | HARQ-ACK(1) | HARQ-ACK(2) | HARQ-ACK(3) | $n_{PUCCH,i}^{(1)}$ | b(0)b(1) |
|---|---|---|---|---|---|
| ACK | ACK | ACK | ACK | $n_{PUCCH,1}^{(1)}$ | 1, 1 |
| ACK | NACK/DTX | ACK | ACK | $n_{PUCCH,2}^{(1)}$ | 0, 1 |
| NACK/DTX | ACK | ACK | ACK | $n_{PUCCH,1}^{(1)}$ | 0, 1 |
| NACK/DTX | NACK/DTX | ACK | ACK | $n_{PUCCH,3}^{(1)}$ | 1, 1 |
| ACK | ACK | ACK | NACK/DTX | $n_{PUCCH,1}^{(1)}$ | 1, 0 |
| ACK | NACK/DTX | ACK | NACK/DTX | $n_{PUCCH,2}^{(1)}$ | 0, 0 |
| NACK/DTX | ACK | ACK | NACK/DTX | $n_{PUCCH,1}^{(1)}$ | 0, 0 |
| NACK/DTX | NACK/DTX | ACK | NACK/DTX | $n_{PUCCH,3}^{(1)}$ | 1, 0 |
| ACK | ACK | NACK/DTX | ACK | $n_{PUCCH,2}^{(1)}$ | 1, 1 |
| ACK | NACK/DTX | NACK/DTX | ACK | $n_{PUCCH,2}^{(1)}$ | 1, 0 |
| NACK/DTX | ACK | NACK/DTX | ACK | $n_{PUCCH,3}^{(1)}$ | 0, 1 |
| NACK/DTX | NACK/DTX | NACK/DTX | ACK | $n_{PUCCH,3}^{(1)}$ | 0, 0 |
| ACK | ACK | NACK/DTX | NACK/DTX | $n_{PUCCH,0}^{(1)}$ | 1, 1 |
| ACK | NACK/DTX | NACK/DTX | NACK/DTX | $n_{PUCCH,0}^{(1)}$ | 1, 0 |
| NACK/DTX | ACK | NACK/DTX | NACK/DTX | $n_{PUCCH,0}^{(1)}$ | 0, 1 |
| NACK/DTX | NACK | NACK/DTX | NACK/DTX | $n_{PUCCH,0}^{(1)}$ | 0, 0 |
| NACK | NACK/DTX | NACK/DTX | NACK/DTX | $n_{PUCCH,0}^{(1)}$ | 0, 0 |
| DTX | DTX | NACK/DTX | NACK/DTX | No transmission | | wherein HARQ-ACK(0) and (1) denote ACK/NACK/DTX responses to transport blocks of the primary cell, HARQ-ACK(2) and (3) denote ACK/NACK/DTX responses to transport blocks of the secondary cell, $n_{PUCCH,i}^{(1)}$ (i = 0, 1, 2, 3) represents a plurality of PUCCH resources for PUCCH format 1b, and b(0)b(1) represents the bit values.
$n_{PUCCH,0}^{(1)}$ and $n_{PUCCH,1}^{(1)}$ may be respectively provided using a lowest CCE (Control Channel Element) index and the following CCE index of CCEs constituting a PDCCH (Physical Downlink Control Channel) corresponding to TBs of the primary cell.
$n_{PUCCH,2}^{(1)}$ and $n_{PUCCH,3}^{(1)}$ may be respectively provided using a lowest CCE index and the following CCE index of CCEs constituting a PDCCH corresponding to TBs of the secondary cell.
$n_{PUCCH,2}^{(1)}$ and $n_{PUCCH,3}^{(1)}$ may be provided using PUCCH resource indexes configured by a RRC (Radio Resource Control) layer.

The plurality of HARQ-ACKs, the PUCCH resource and the bit values may have the relationship shown in Table 2

TABLE 2

| HARQ-ACK(0) | HARQ-ACK(1) | HARQ-ACK(2) | $n_{PUCCH,i}^{(1)}$ | b(0)b(1) |
|---|---|---|---|---|
| ACK | ACK | ACK | $n_{PUCCH,1}^{(1)}$ | 1, 1 |
| ACK | NACK/DTX | ACK | $n_{PUCCH,1}^{(1)}$ | 1, 0 |
| NACK/DTX | ACK | ACK | $n_{PUCCH,1}^{(1)}$ | 0, 1 |
| NACK/DTX | NACK/DTX | ACK | $n_{PUCCH,2}^{(1)}$ | 1, 1 |
| ACK | ACK | NACK/DTX | $n_{PUCCH,0}^{(1)}$ | 1, 1 |
| ACK | NACK/DTX | NACK/DTX | $n_{PUCCH,0}^{(1)}$ | 1, 0 |
| NACK/DTX | ACK | NACK/DTX | $n_{PUCCH,0}^{(1)}$ | 0, 1 |
| NACK/DTX | NACK/DTX | NACK | $n_{PUCCH,2}^{(1)}$ | 0, 0 |
| NACK | NACK/DTX | DTX | $n_{PUCCH,0}^{(1)}$ | 0, 0 |
| NACK/DTX | NACK | DTX | $n_{PUCCH,0}^{(1)}$ | 0, 0 |
| DTX | DTX | DTX | No transmission | | wherein HARQ-ACK(0) and (1) denote ACK/NACK/DTX responses to data block(s) of a serving cell set to a transmission mode supporting transmission of 2 transport blocks, HARQ-ACK(2) denotes an ACK/NACK/DTX response to data block of a serving cell set to a transmission mode supporting transmission of a single transport block, $n_{PUCCH,i}^{(1)}$ (i = 0, 1, 2) represents a plurality of PUCCH resources for PUCCH format 1b, and b(0)b(1) represents the bit values.

Advantageous Effects

According to the present invention, uplink control information can be efficiently transmitted in a wireless communication system. Furthermore, control information, preferably, ACK/NACK information can be efficiently transmitted in a multicarrier situation.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIGS. 9 to 12 illustrate a conventional ACK/NACK channel selection scheme for LTE-A;

FIGS. 13 and 14 illustrate channel selection schemes according an embodiments of the present invention.

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11

(Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A to clarify the description, this is purely exemplary and thus should not be construed as limiting the present invention.

Figure 1:
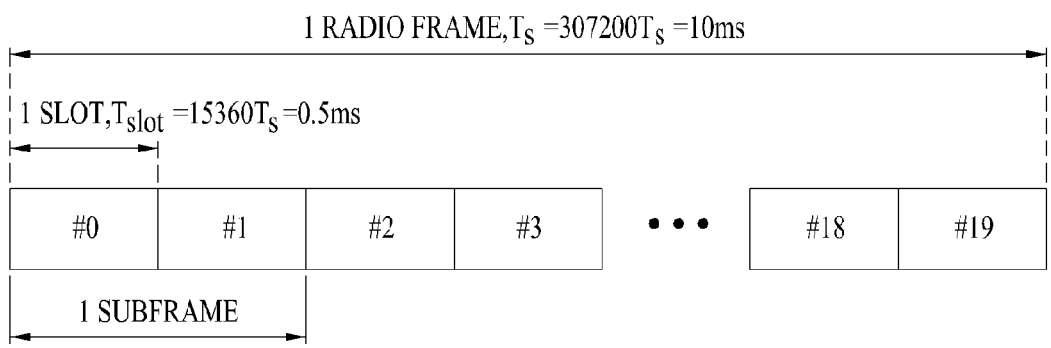
FIG. 1 illustrates a radio frame structure.

FIG. 1 illustrates a radio frame structure.

Referring to FIG. 1, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) or single carrier frequency division multiple access (SC-FDMA) symbols in time domain. Since LTE uses the OFDMA in the downlink and uses SC-FDMA in the uplink, an OFDM or SC-FDMA symbol represents one symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

Figure 2:
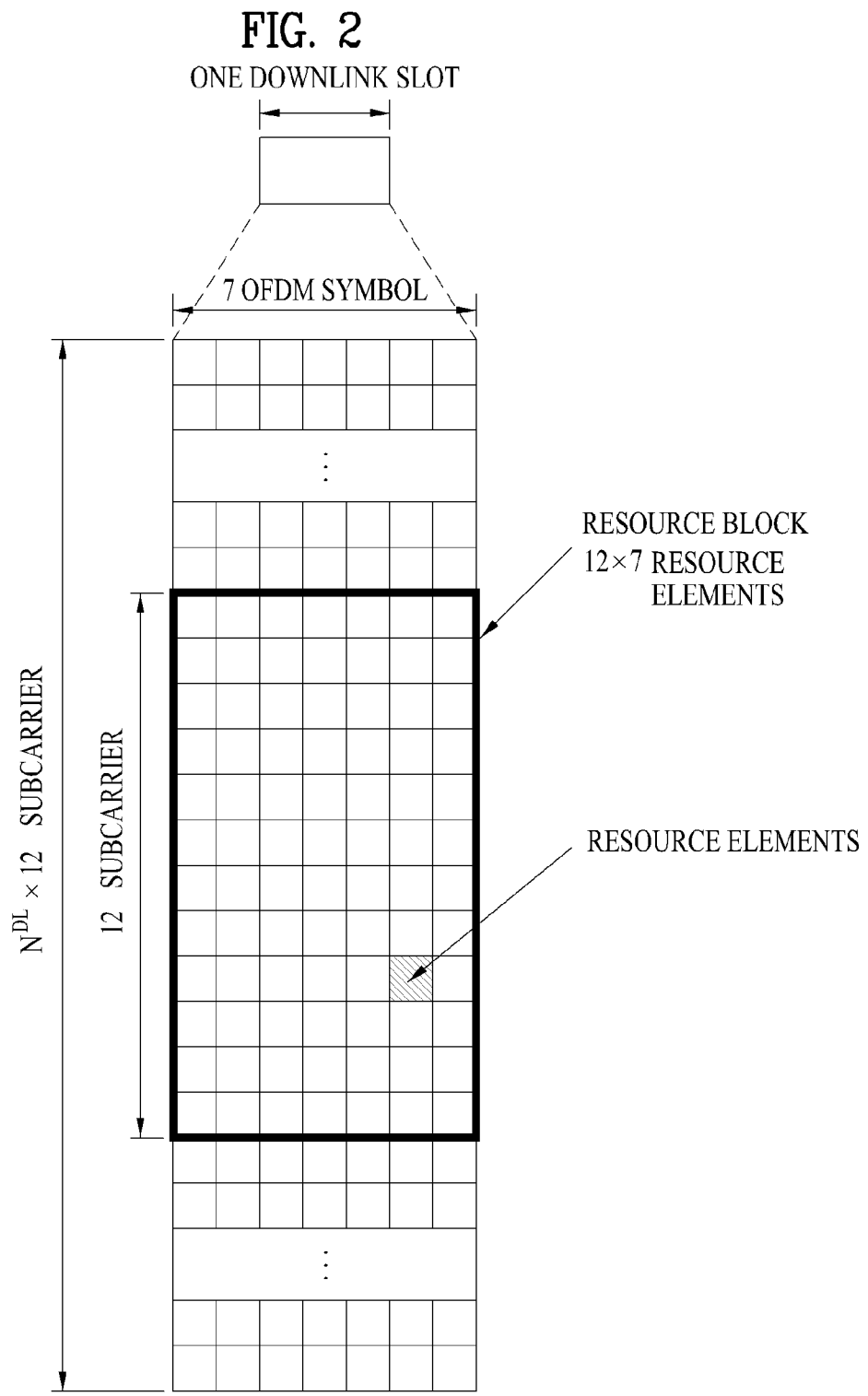
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 3:
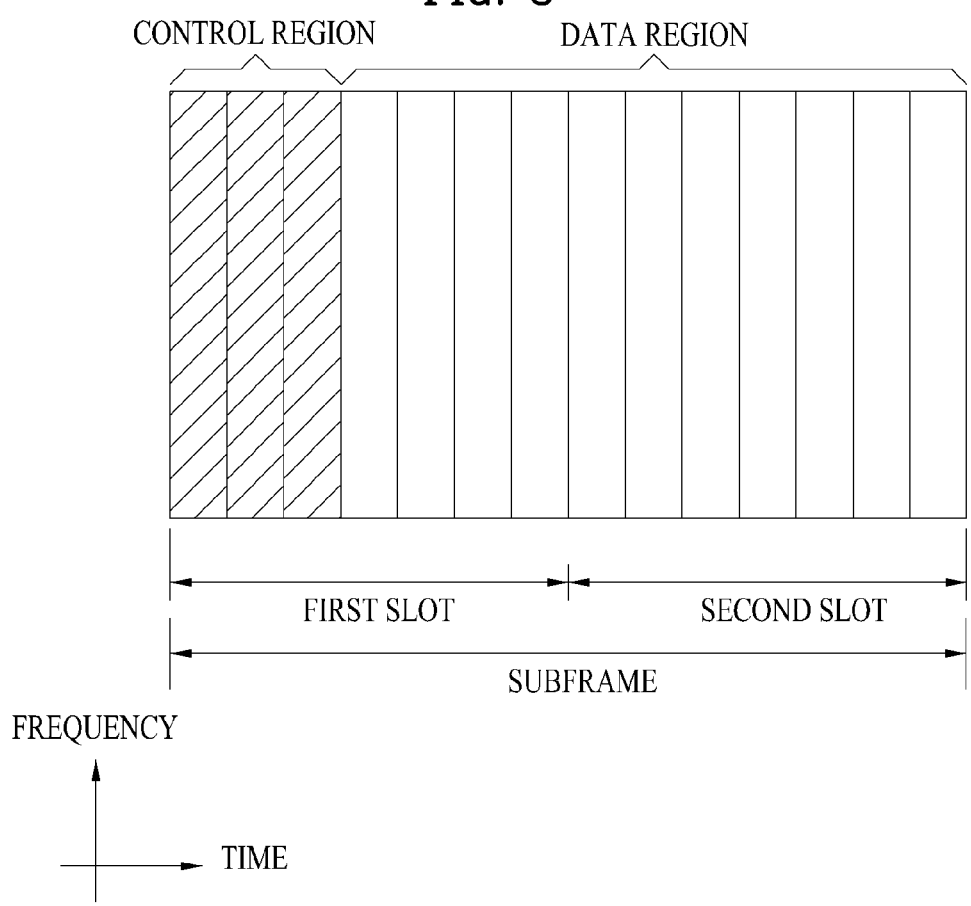
FIG. 3 illustrates a downlink subframe structure.

FIG. 3 illustrates a downlink subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A PDSCH is used to carry a transport block (TB) or a codeword (CW) corresponding to the TB. The TB means a data block transmitted from a MAC layer to a PHY layer through a transport channel. The codeword corresponds to a coded version of a TB. The corresponding relationship between the TB and the CW depends on swiping. In the specifically, the PDSCH, TB and CW are interchangeably used. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal.

Control information transmitted through the PDCCH is referred to as downlink control information (DCI). The DCI includes resource allocation information for a UE or a UE group and other control information. For example, the DCI includes uplink/downlink scheduling information, an uplink transmit (Tx) power control command, etc. Transmission modes and information content of DCI formats for configuring a multi-antenna technology are as follows.

Transmission Mode
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO
Transmission mode 6: Closed-loop rank-1 precoding
Transmission mode 7: Transmission using UE-specific reference signals DCI Format
Format 0: Resource grants for the PUSCH transmissions (uplink)
Format 1: Resource assignments for single codeword PDSCH transmissions (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments As described above, the PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoI P), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 4:
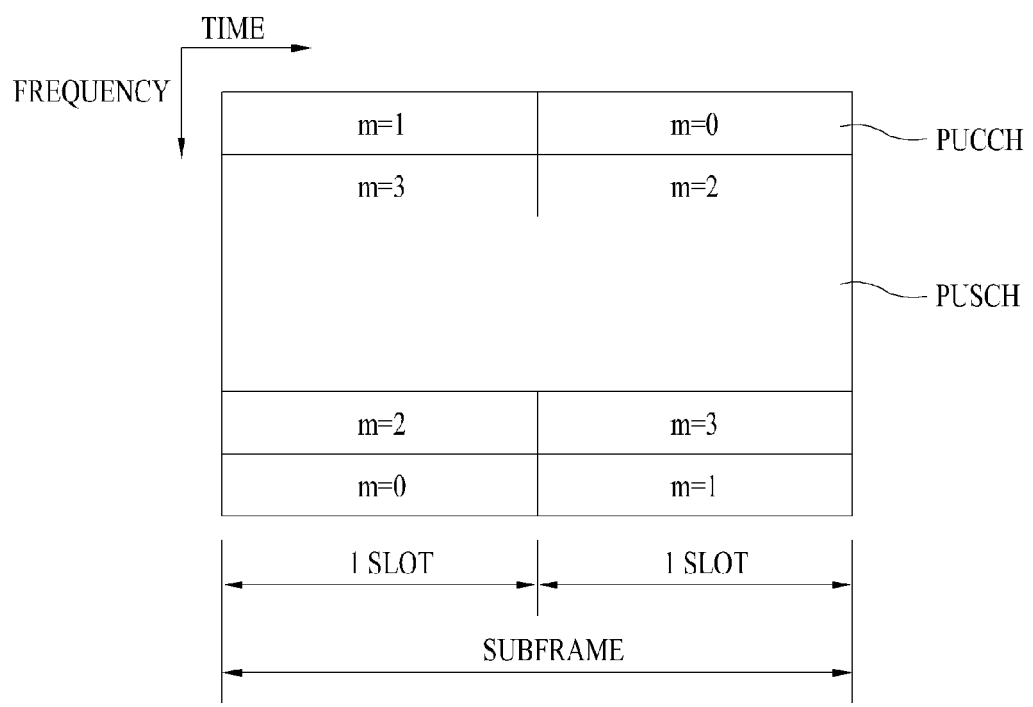
FIG. 4 illustrates an uplink subframe structure.

FIG. 4 illustrates an uplink subframe structure.

Referring to FIG. 4, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.

Channel Quality Indicator (CQI): This is feedback information about a downlink channel. Feedback information regarding Multiple Input Multiple Output (MIMO) includes Rank Indicator (RI) and Precoding Matrix Indicator (PMI). 20 bits are used for each subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports 7 formats according to information transmitted thereon.

Table 1 shows the mapping relationship between PUCCH formats and UCI in LTE.

TABLE 1

| PUCCH format | UCI (Uplink Control Information) |
|---|---|
| Format 1 | SR (Scheduling Request) (non-modulated waveform |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |

Figure 5:
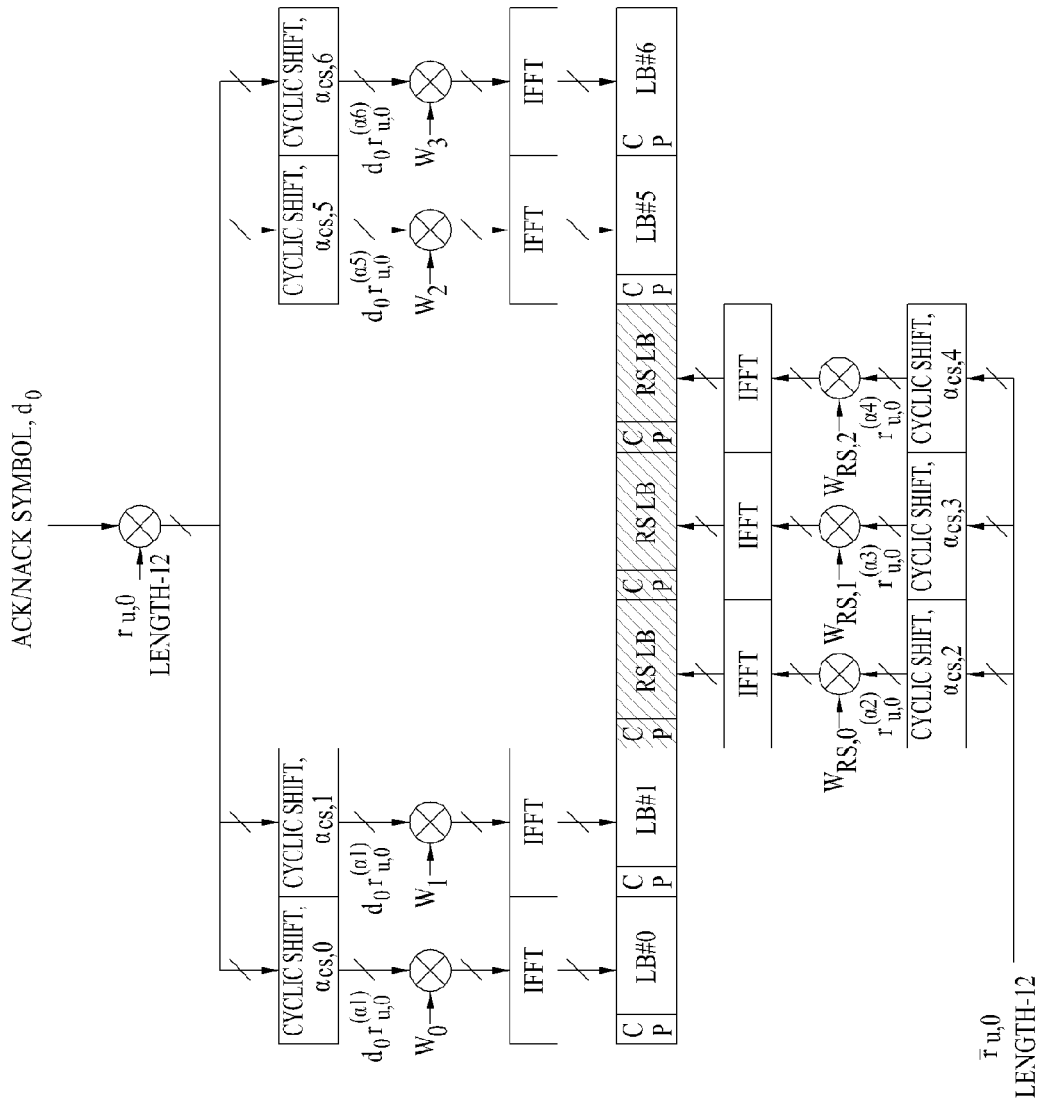
FIG. 5 illustrates a slot level structure of PUCCH format 1a/1b.

FIG. 5 illustrates a slot level structure of PUCCH formats 1a/1b. The PUCCH formats 1a/1b are used for ACK/NACK transmission. In the case of normal CP, SC-FDMA symbols #2, #3 and #4 are used for DM RS transmission. In the case of extended CP, SC-FDMA symbols #2 and #3 are used for DM RS transmission. Accordingly, 4 SC-FDMA symbols in a slot are used for ACK/NACK transmission. For convenience, PUCCH format 1a/1b may be called PUCCH format 1 in the description.

Referring to FIG. 5, 1-bit [b(0)] and 2-bit [b(0)b(1)] ACK/NACK information are modulated according to BPSK and QPSK modulation schemes respectively, to generate one ACK/NACK modulation symbol $d_0$. Each bit [b(i), i=0, 1] of the ACK/NACK information indicates a HARQ response to a corresponding DL transport block, corresponds to 1 in the case of positive ACK and corresponds to 0 in case of negative ACK (NACK). Table 2 shows a modulation table defined for PUCCH formats 1a and 1b in LTE.

TABLE 2

| PUCCH format | b(0), . . . , b($M_{bit}$ − 1) | d(0) |
|---|---|---|
| 1a | 0 | 1 |
|  | 1 | −1 |
| 1b | 00 | 1 |
|  | 01 | −j |
|  | 10 | j |
|  | 11 | −1 |

PUCCH formats 1a/1b perform time domain spreading using an orthogonal spreading code $W_0$, $W_1$, $W_2$, $W_3$, (e.g. Walsh-Hadamard or DFT code) in addition to cyclic shift $\alpha_{cs,x}$ in the frequency domain. In the case of PUCCH formats 1a/1b, a larger number of UEs can be multiplexed on the same PUCCH RB because code multiplexing is used in both frequency and time domains.

RSs transmitted from different UEs are multiplexed using the same method as is used to multiplex UCI. The number of cyclic shifts supported by SC-FDMA symbols for PUCCH ACK/NACK RB can be configured by cell-specific higher layer signaling parameter $\Delta_{shift}^{PCCH}$. $\Delta_{shift}^{PUCCH} \in \{1, 2, 3\}$ represents that shift values are 12, 6 and 4, respectively. In time-domain CDM, the number of spreading codes actually used for ACK/NACK can be limited by the number of RS symbols because multiplexing capacity of RS symbols is less than that of UCI symbols due to a smaller number of RS symbols.

Figure 6:
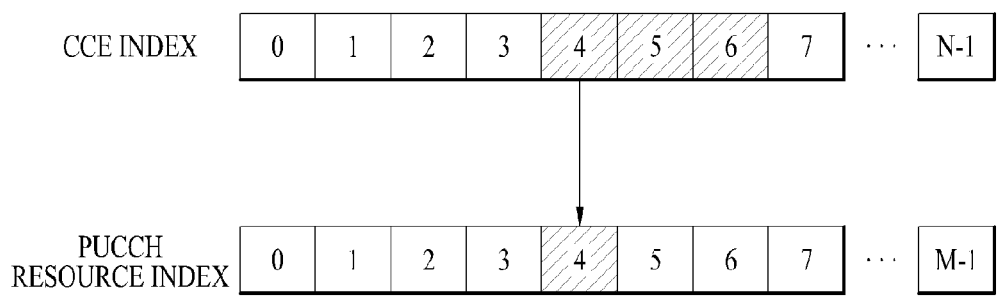
FIG. 6 illustrates an example of determining a PUCCH resource for ACK/NACK.

FIG. 6 illustrates an example of determining PUCCH resources for ACK/NACK. In LTE, a plurality of PUCCH resources for ACK/NACK are shared by a plurality of UEs in a cell every time the UEs need the PUCCH resources rather than allocated to UEs in advance. Specifically, a PUCCH resource used by a UE to transmit an ACK/NACK signal corresponds to a PDCCH on which scheduling information on DL data is delivered. The region in which the PDCCH is transmitted in a DL subframe is configured with a plurality of Control Channel Elements (CCEs), and the PDCCH transmitted to the UE is composed of one or more CCEs. The UE transmits the ACK/NACK signal through a PUCCH resource corresponding to a specific one (e.g. first CCE) of the CCEs constituting the received PDCCH.

Figure 8:
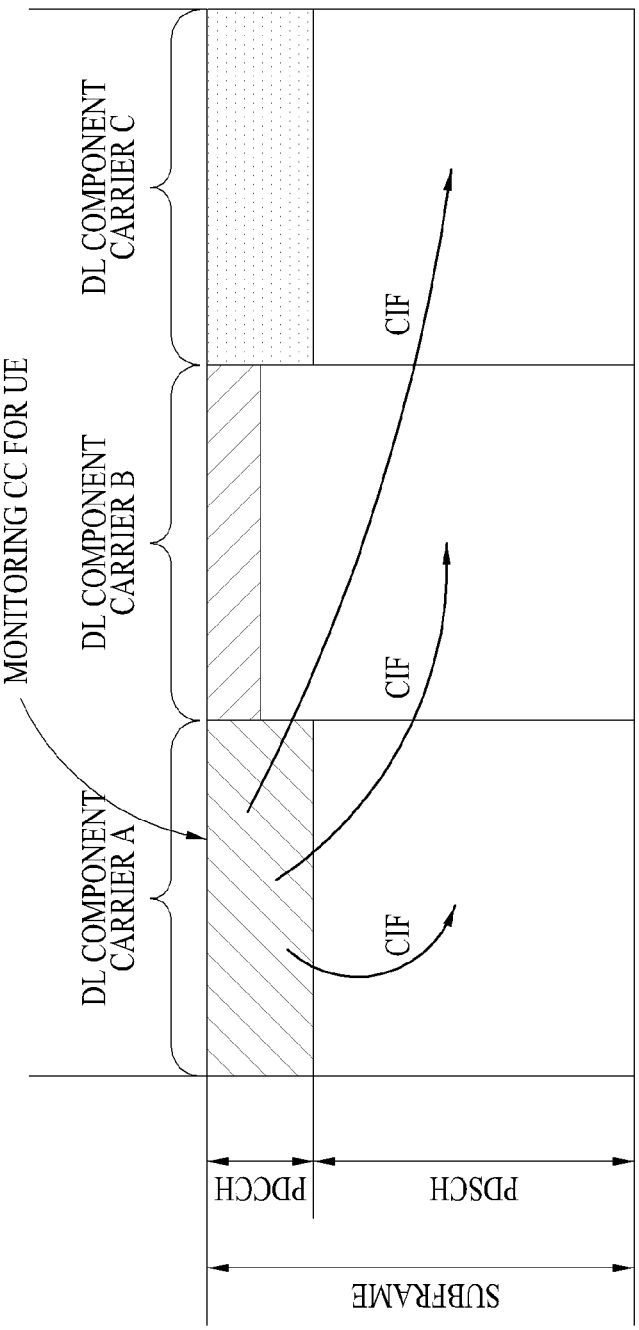
FIG. 8 illustrates scheduling in case of aggregation of a plurality of carriers.

Referring to FIG. 6, each block in a Downlink Component Carrier (DL CC) represents a CCE and each block in an Uplink Component Carrier (UL CC) indicates a PUCCH resource. Each PUCCH index corresponds to a PUCCH resource for an ACK/NACK signal. If information on a PDSCH is delivered on a PDCCH composed of CCEs #4, #5 and #6, as shown in FIG. 8, a UE transmits an ACK/NACK signal on PUCCH #4 corresponding to CCE #4, the first CCE of the PDCCH. FIG. 6 illustrates a case in which maximum M PUCCHs are present in the UL CC when maximum N CCEs exist in the DL CC. Though N can equal M, N may differ from M and CCEs are mapped to PUCCHs in an overlapped manner.

Specifically, a PUCCH resource index in LTE is determined as follows.

$$n_{PUCCH}^{(1)} = n_{CCE} + N^{(1)}_{PUCCH}$$ [Equation 1]

Here, $n^{(1)}_{PUCCH}$ represents a resource index of PUCCH format 1 for ACK/NACK/DTX transmission, $N^{(1)}_{PUCCH}$ denotes a signaling value received from a higher layer, and $n_{CCE}$ denotes the smallest value of CCE indexes used for PDCCH transmission. A cyclic shift, an orthogonal spreading code and a Physical Resource Block (PRB) for PUCCH formats 1a/1b are obtained from $n^{(1)}_{PUCCH}$.

When an LTE system operates in TDD, a UE transmits one multiplexed ACK/NACK signal for a plurality of PDSCHs received through subframes at different timings. Specifically, the UE transmits one multiplexed ACK/NACK signal for a plurality of PDSCHs using a PUCCH selection transmission scheme. PUCCH selection transmission is also referred to as ACK/NACK channel selection. When the UE receives a plurality of DL data in PUCCH selection transmission, the UE occupies a plurality of UL physical channels in order to transmit a multiplexed ACK/NACK signal. For example, when the UE receives a plurality of PDSCHs, the UE can occupy the same number of PUCCHs as the PDSCHs using a specific CCE of a PDCCH which indicates each PDSCH. In this case, the UE can transmit a multiplexed ACK/NACK signal using combination of which one of the occupied PUCCHs is selected and modulated/coded results applied to the selected PUCCH.

Table 3 shows a PUCCH selection transmission scheme defined in LTE.

TABLE 3

| HARQ-ACK(0), HARQ-ACK(1), HARQ-ACK(2), HARQ-ACK(3) | Subframe $n^{(1)}_{PUCCH,X}$ | b(0), b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In Table 3, HARQ-ACK(i) indicates the HARQ ACK/NACK/DTX result of an i-th data unit (0 ≤ i ≤ 3). The HARQ ACK/NACK/DTX result includes ACK, NACK, DTX and NACK/DTX. NACK/DTX represents NACK or DTX. ACK and NACK represent whether a TB (equivalent to a CW) transmitted through a PDSCH has been successfully decoded or not. DTX (Discontinuous Transmission) represents that a PDCCH has not been successfully detected. Maximum 4 PUCCH resources (i.e., $n^{(1)}_{PUCCH,0}$ to $n^{(1)}_{PUCCH,3}$) can be occupied for each data unit. The multiplexed ACK/NACK signal is transmitted through one PUCCH resource selected from the occupied PUCCH resources. In Table 3, $n^{(1)}_{PUCCH,X}$ represents a PUCCH resource actually used for ACK/NACK transmission, and b(0)b(1) indicates two bits transmitted through the selected PUCCH resource, which are modulated using QPSK. For example, when the UE has decoded 4 data units successfully, the UE transmits bits (1, 1) to a BS through a PUCCH resource linked with $n^{(1)}_{PUCCH,1}$. Since combinations of PUCCH resources and QPSK symbols cannot represent all available ACK/NACK suppositions, NACK and DTX are coupled except in some cases (NACK/DTX, N/D).

Figure 7:
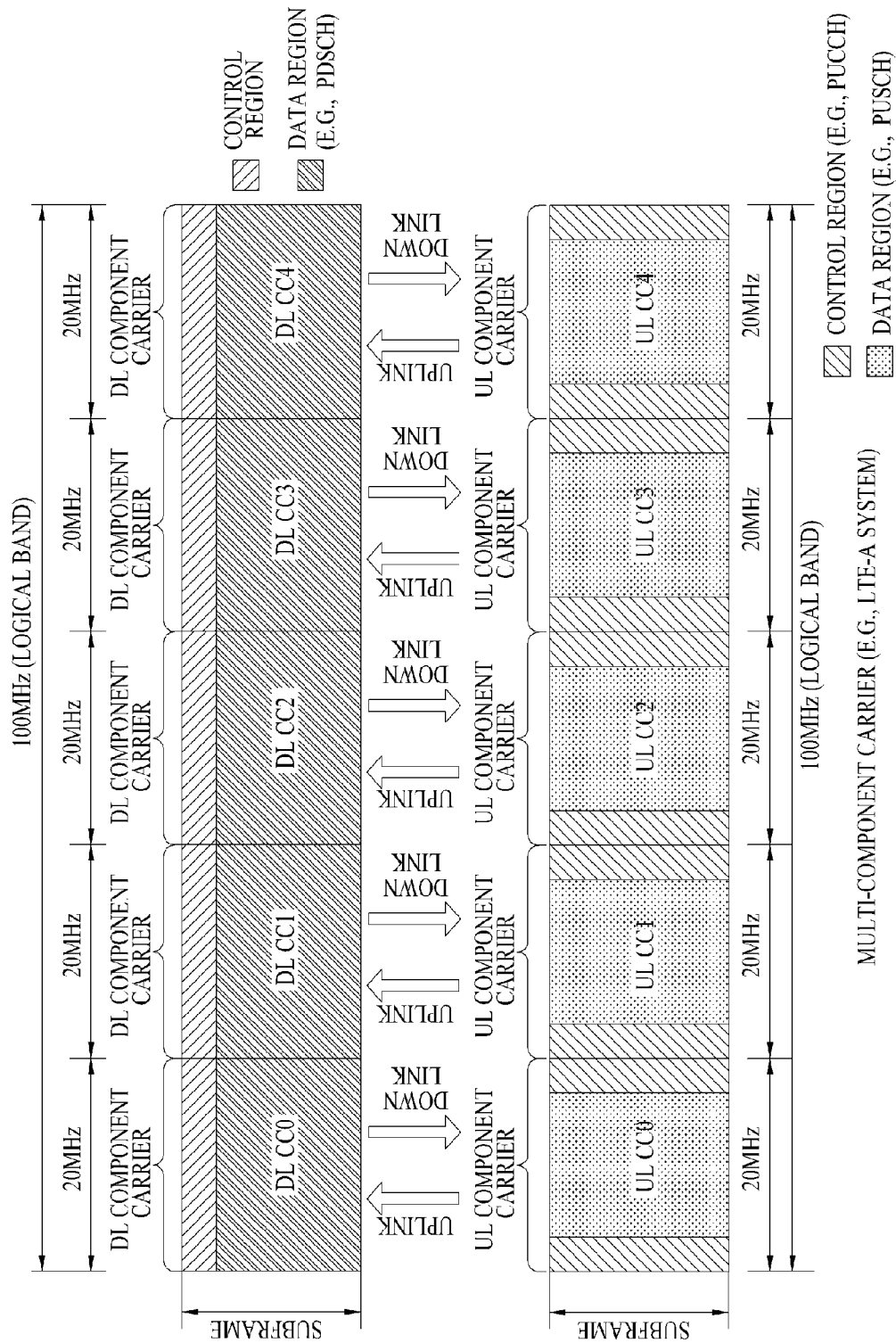
FIG. 7 illustrates a carrier aggregation (CA) communication system.

FIG. 7 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 7, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

FIG. 8 illustrates scheduling when a plurality of carriers is aggregated. It is assumed that 3 DL CCs are aggregated and DL CC A is set to a PDCCH CC. DL CC A, DL CC B and DL CC C can be called serving CCs, serving carriers, serving cells, etc. In case of CIF disabled, a DL CC can transmit only a PDCCH that schedules a PDSCH corresponding to the DL CC without a CIF. When the CIF is enabled according to UE-specific (or UE-group-specific or cell-specific) higher layer signaling, DL CC A (monitoring DL CC) can transmit not only a PDCCH that schedules the PDSCH corresponding to the DL CC A but also PDCCHs that schedule PDSCHs of other DL CCs. In this case, DL CC B and DL CC C that are not set to PDCCH CCs do not deliver PDCCHs. Accordingly, the DL CC A (PDCCH CC) needs to include all of a PDCCH search space relating to the DL CC A, a PDCCH search space relating to the DL CC B and a PDCCH search space relating to the DL CC C.

LTE-A considers transmission of a plurality of ACK/NACK information/signals with respect to a plurality of PDSCHs, which are transmitted through a plurality of DL CCs, through a specific UL CC (e.g. UL PCC or UL PCell). For description, it is assumed that a UE operates in a SU-MIMO (Single User-Multiple Input Multiple Output) mode in a certain DL CC to receive 2 codewords (or transport blocks). In this case, the UE needs to be able to transmit 4 feedback states, ACK/ACK, ACK/NACK, NACK/ACK and NACK/NACK, or up to 5 feedback states including even DTX for the DL CC. If the DL CC is set to support a single codeword (or transport block), up to 3 states of ACK, NACK and DTX are present for the DL CC. Accordingly, if NACK and DTX are processed as the same state, a total of 2 feedback states of ACK and NACK/DTX are present for the DL CC. Accordingly, if the UE aggregates a maximum of 5 DL CCs and operates in the SU-MIMO mode in all CCs, the UE can have up to 55 transmittable feedback states and an ACK/NACK payload size for representing the feedback states corresponds to 12 bits. If DTX and NACK are processed as the same state, the number of feedback states is 45 and an ACK/NACK payload size for representing the same is 10 bits.

FDD LTE-A discusses transmission of a plurality of ACK/NACK information/signals using PUCCH format 1a/1b and ACK/NACK multiplexing (i.e. ACK/NACK channel selection) where were used in a conventional LTE TDD system in a multicarrier situation. The conventional LTE TDD system uses an implicit ACK/NACK selection scheme of using a PUCCH resource corresponding to each PDCCH that schedules each PDSCH (i.e. linked to a lowest CCE index) as an ACK/NACK multiplexing (i.e. ACK/NACK selection) method to secure PUCCH resources. However, when the implicit ACK/NACK selection scheme is applied using PUCCH resources in different RBs, performance deterioration may occur. Accordingly, LTE-A discusses an explicit ACK/NACK selection scheme that reserves PUCCH resources through RRC signaling, preferably, a plurality of PUCCH resources in the same RB or neighboring RBs, for a UE.

Table 4 shows an example of explicitly indicating a PUCCH resource for HARQ-ACK. Specifically, a PUCCH resource set can be configured by a higher layer (e.g. RRC) and a PUCCH resource to be actually used can be indicated using an ARI (ACK/NACK Resource Indicator) value of a PDCCH. The ARI value can be indicated using a TPC (Transmit Power Control) field of a PDCCH corresponding to a PDSCH on an SCell. The ARI value can also be indicated in different manners. The ARI value is used interchangeably with a HARQ-ACK resource indication value.

TABLE 4

| HARQ-ACK resource value (ARI) for PUCCH | $n_{PUCCH}$ |
|---|---|
| 00 | First PUCCH resource value configured by a higher layer |
| 01 | Second PUCCH resource value configured by a higher layer |
| 10 | Third PUCCH resource value configured by a higher layer |
| 11 | Fourth PUCCH resource value configured by a higher layer |

A description will be given of the conventional ACK/NACK channel selection scheme of LTE-A with reference to FIGS. 9 to 12. A mapping table for ACK/NACK channel selection in LTE-A was designed under the following conditions.

(1) Full implicit PUCCH resource indication is supported. An implicit PUCCH resource means a PUCCH resource linked to a specific CCE (e.g. first CCE) from among one or more CCEs that constitute a DL grant PDCCH (refer to Equation 1).

(2) LTE fullback is supported. LTE fallback is a scheme in which a PUCCH format used for ACK/NACK state transmission and a modulation symbol transmitted in the PUCCH format conform to the scheme defined in LTE when serving cells (i.e. SCells) other than a PCell all correspond to NACK/DTX. Mapping of ACK/NACK states and modulation symbols are determined on the basis of ACK/NACK for the PCell.

(3) Performances of individual ACK/NACK bits are equalized by improving worst ACK/NACK bit performance and average performance.

Figure 9:
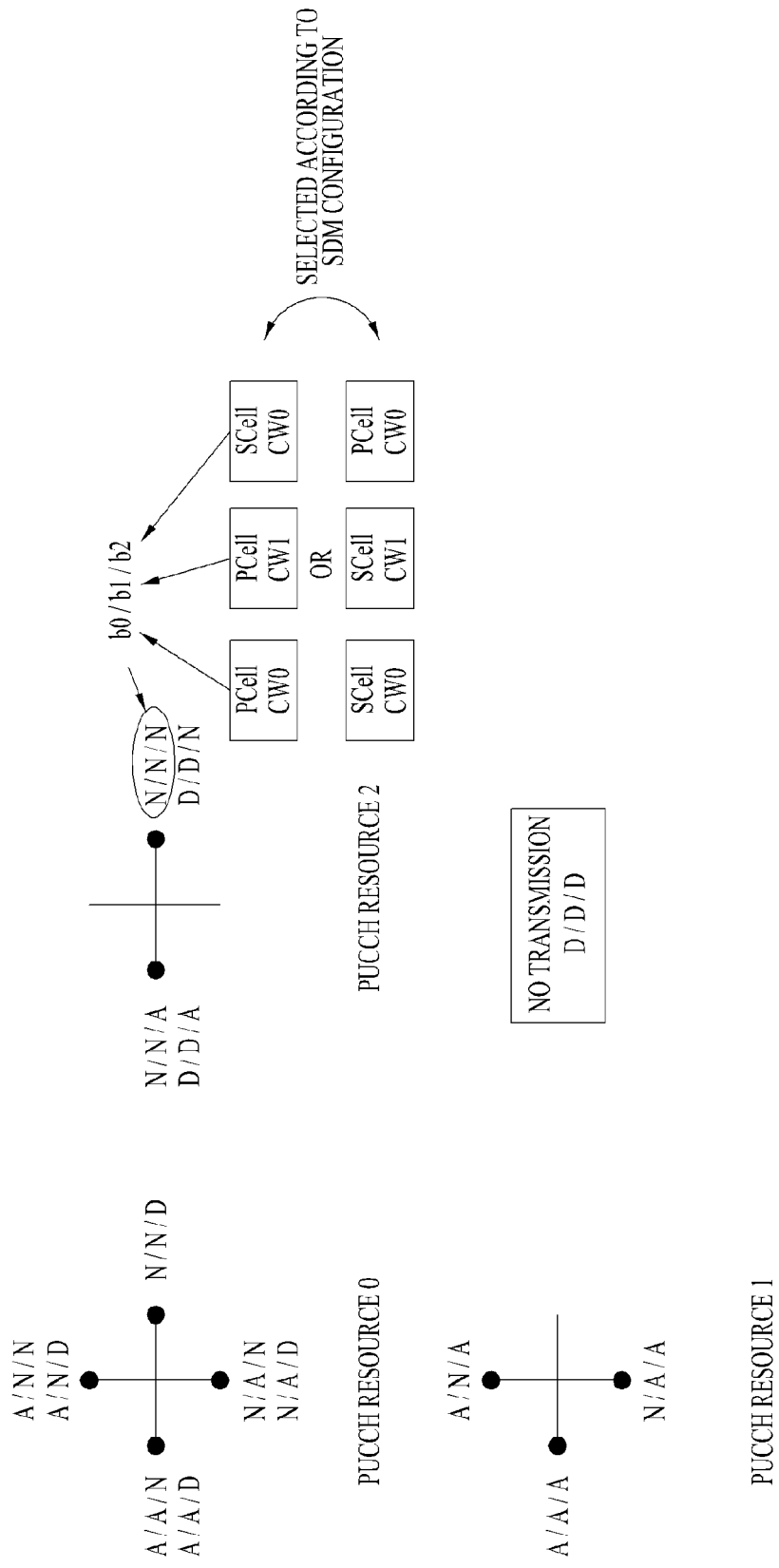

FIGS. 9 and 10 illustrate a mapping scheme for ACK/NACK channel selection. 3-bit ACK/NACK channel selection of LTE-A is based on the assumption that 2 serving cells are aggregated. Accordingly, the 3-bit ACK/NACK channel selection corresponds to a case in which a single SDM (Spatial Division Multiplexing) cell and a single non-SDM cell are aggregated. The SDM cell is a cell set to a transmission mode that supports transmission of a maximum of m (e.g. m=2) transport blocks.

Referring to FIG. 9, cells and CWs corresponding to HARQ-ACK(0), (1) and (2) (b0/b1/b2 in the figure) depend on an SDM configuration. Specifically, in case of SDM PCell and non-SDM SCell, HARQ-ACK(0), (1) and (2) respectively correspond to PCell CW0, PCell CW1 and SCell CW0. In case of non-SDM PCell and SDM SCell, HARQ-ACK(0), (1) and (2) respectively correspond to SCell CW0, SCell CW1 and PCell CW0. That is, HARQ-ACK(0), (1) and (2) respectively correspond to SDM cell CW0, SDM cell CW1 and non-SDM cell CW0.

Table 5 shows the corresponding relationship between HARQ-ACKs and CWs in the 3-bit ACK/NACK channel selection scheme. A CW is equivalent to a TB. Table 5 is based on the TB.

TABLE 5

| HARQ-ACK(j) | | | |
|---|---|---|---|
| HARQ-ACK(0) | HARQ-ACK(1) | HARQ-ACK(2) | HARQ-ACK(3) |
| TB1 serving cell 1 | TB2 serving cell 1 | TB1 serving cell 2 | NA |

Here, serving cell 1 represents a cell (i.e. SDM cell) set to a transmission mode supporting transmission of up to 2 TBs and serving cell 2 represents a cell (i.e. non-SDM cell) set to a transmission mode supporting transmission of a single TB.

When a PCell is set to the SDM mode, PUCCH resources #0 and #1 are implicitly signaled. For example, PUCCH resources #0 and #1 can be linked to CCEs (e.g. a lowest CCE index and the lowest CCE index+1) which constitute a DL grant PDCCH corresponding to a PDSCH of the PCell (refer to Equation 1). PUCCH resource #2 can be linked to a CCE (e.g. a lowest CCE index) constituting a DL grant PDCCH corresponding to a PDSCH of an SCell or explicitly signaled by RRC.

When the PCell is set to the non-SDM mode, PUCCH resource #2 can be linked to a CCE (e.g. the lowest CCE index) which constitutes the DL grant PDCCH corresponding to the PDSCH of the PCell. PUCCH resources #0 and #1 can be linked to CCEs (e.g. the lowest CCE index and the lowest CCE index+1) constituting the DL grant PDCCH corresponding to the PDSCH of the SCell or explicitly signaled by RRC.

To support LTE PUCCH format 1b (LTE fallback when the PCell is an SDM cell), an ACK/NACK/DTX (A/A/D) state is mapped to −1 of PUCCH resource #0 and a NACK/NACK/DTX (N/N/D) state is mapped to +1 of PUCCH resource #0. To support PUCCH format 1a (LTE fallback when the PCell is a non-SDM cell), a DTX/DTX/ACK (D/D/A) state is mapped to −1 of PUCCH resource #2 and a DTX/DTX/NACK (D/D/N) state is mapped to +1 of PUCCH resource #2.

ACK/NACK mapping illustrated in FIG. 9 has been designed to equalize performances of individual ACK/NACK bits by improving worst ACK/NACK bit performance and average performance.

FIG. 10 shows a 3-bit mapping table configured according to FIG. 9. Referring to FIG. 10, when a UE receives a PDSCH from a BS, the UE generates HARQ-ACK(0), (1) and (2) according to the SDM configuration of a serving cell. The UE selects PUCCH resources (e.g. $n_{PUCCH,i}^{(1)}$) corresponding to HARQ-ACK(0), (1) and (2) and transmits bit values (or modulated values) corresponding to HARQ-ACK (0), (1) and (2) to the BS through the selected PUCCH resources. PUCCH resources #0 to #2 respectively correspond to $n_{PUCCH,0}^{(1)} \sim n_{PUCCH,2}^{(1)}$. (FIG. 10 assumes QPSK modulation.

Figure 11:
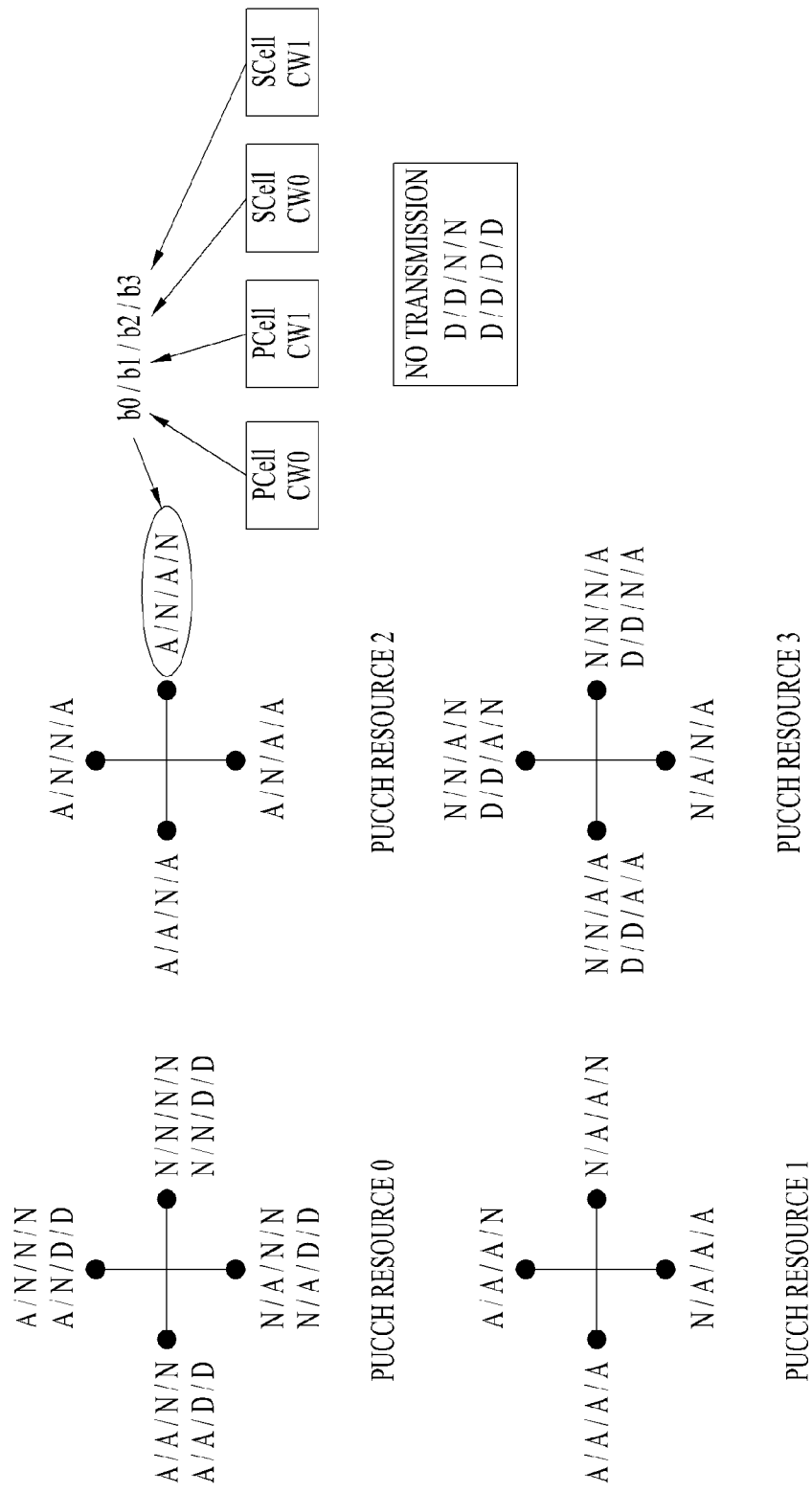

FIGS. 11 and 12 illustrate a mapping scheme for 4-bit ACK/NACK channel selection. The 4-bit ACK/NACK channel selection of LTE-A is based on the assumption that 2 serving cells are aggregated. Accordingly, the 4-bit ACK/NACK channel selection corresponds to a case in which 2 SDM cells are aggregated.

Referring to FIG. 11, HARQ-ACK(0), (1), (2) and (3) (b0/b1/b2/b3 in the figure) respectively correspond to PCell CW0, PCell CW1, SCell CW0 and SCell CW1. Table 6 shows the corresponding relationship between HARQ-ACKs and CWs in the 4-bit ACK/NACK channel selection scheme. A CW is equivalent to a TB. Table 6 is based on the TB.

TABLE 6

| HARQ-ACK(j) | | | |
|---|---|---|---|
| HARQ-ACK(0) | HARQ-ACK(1) | HARQ-ACK(2) | HARQ-ACK(3) |
| TB1 primary cell 1 | TB2 primary cell 1 | TB1 secondary cell 2 | TB2 secondary cell 2 |

In this example, PUCCH resources #0 and #1 are implicitly signaled. For example, PUCCH resources #0 and #1 can be linked to CCEs (e.g. the lowest CCE index and the lowest CCE index+1) which constitute the DL grant PDCCH corresponding to the PDSCH of the PCell (refer to Equation 1). PUCCH resources #2 and #3 can be linked to CCEs (e.g. the lowest CCE index and the lowest CCE index+1) constituting the DL grant PDCCH corresponding to the PDSCH of the SCell or explicitly signaled by RRC.

To support LTE PUCCH format 1b (LTE fallback), an ACK/NACK/DTX/DTX (A/A/D/D) state is mapped to −1 of PUCCH resource #0 and a NACK/NACK/DTX/DTX (N/N/D/D) state is mapped to +1 of PUCCH resource #0.

ACK/NACK mapping illustrated in FIG. 11 has been designed to equalize performances of individual ACK/NACK bits by improving worst ACK/NACK bit performance and average performance.

FIG. 12 shows a 4-bit mapping table configured according to FIG. 11. Referring to FIG. 12, when the UE receives a PDSCH from the BS, the UE generates HARQ-ACK(0), (1), (2) and (3) according to the SDM configuration of a serving cell. The UE selects PUCCH resources (e.g. $n_{PUCCH,i}^{(1)}$) corresponding to HARQ-ACK(0), (1), (2) and (3) and transmits bit values (or modulated values) corresponding to HARQ-ACK(0), (1), (2) and (3) to the BS through the selected PUCCH resources. PUCCH resources #0 to #3 respectively correspond to $n_{PUCCH,0}^{(1)} \sim n_{PUCCH,3}^{(1)}$. (FIG. 12 assumes QPSK modulation.

Embodiment

The conventional mapping schemes/tables for ACK/NACK channel selection described above with reference to FIGS. 9 to 12 have been designed to support only a case in which 2 serving cells are aggregated without spatial bundling. Spatial bundling bundles a plurality of HARQ-ACKs for a plurality of CWs received in a single subframe of a corresponding cell into one HARQ-ACK through a logical AND operation. That is, the mapping schemes/tables for 3-bit/4-bit ACK/NACK channel selection cannot be applied to a case in which three or more serving cells are aggregated. However, application of the conventional mapping schemes/tables for ACK/NACK channel selection is limited because up to 5 CCs (i.e. serving cells) can be aggregated on downlink in LTE-A, as described above with reference to FIG. 7.

Accordingly, an ACK/NACK channel selection scheme applicable to even a case in which three or more serving cells are aggregated is required. For example, a scheme for applying 3-bit ACK/NACK channel selection to a case in which 3 non-SDM cells are aggregated is needed. Furthermore, a scheme for applying 4-bit ACK/NACK channel selection to a case in which one SDM cell and 2 non-SDM cells are aggregated or a case in which 4 non-SDM cells are aggregated is required. A non-SDM cell in the above example can be replaced by an SDM cell to which spatial bundling has been applied or an SDM cell group to which spatial bundling/cell bundling has been applied. Here, spatial bundling is a scheme for bundling a plurality of HARQ-ACKs for a plurality of CWs received in a subframe of a corresponding cell into one HARQ-ACK through a logical AND operation. Cell bundling is a scheme for bundling a plurality of HARQ-ACKs for a plurality of cells into one HARQ-ACK though a logical AND operation.

To solve the above-described problem, a scheme of additionally defining a mapping table for 3-bit/4-bit ACK/NACK channel selection when three or more serving cells are aggregated can be considered. In this case, a mapping table in case of aggregation of 3 non-SDM cells needs to be additionally defined for 3-bit ACK/NACK channel selection. For O-bit ACK/NACK channel selection, it is necessary to additionally define mapping tables corresponding to case (1) in which one SDM cell and 2 non-SDM cells are aggregated and case (2) in which 4 non-SDM cells are aggregated.

When mapping tables for a case in which three or more serving cells are aggregated are newly defined, the number of ACK/NACK combinations necessary for each mapping table is as follows. For reference, HARQ-ACK responses to a non-SDM cell may include ACK, NACK and DTX and HARQ-ACK responses to an SDM cell may include {ACK, ACK}, {ACK, NACK}, {NACK, ACK}, {NACK, NACK} and {DTX}. DTX means PDCCH detection failure, and thus DTX is irrelevant to SDM.

(1) 3-bit ACK/NACK channel selection
Case in which 3 non-SDM cells are aggregated: 3*3*3=27 cases
(2) 4-bit ACK/NACK channel selection
Case in which 1 SDM cell and 2 non-SDM cells are aggregated: 5*3*3=45 cases
Case in which 4 non-SDM cells are aggregated: 3*3*3*4=81 cases Eventually, configuration of mapping tables for ACK/NACK channel selection when three or more cells are aggregated can considerably complicate an ACK/NACK feedback process.

Therefore, the present invention proposes an efficient ACK/NACK channel selection scheme/mapping table applicable irrespective of cell configuration (e.g. the number of aggregated cells, whether a cell is set to SDM or not, etc.). Specifically, the present invention proposes an ACK/NACK channel mapping scheme for allocating one HARQ-ACK per cell (non-SDM cell or SDM cell to which spatial bundling has been applied) or per cell group (to which spatial bundling and/or cell bundling has been applied) to support ACK/NACK channel selection based ACK/NACK feedback when three or more cells are aggregated. The present invention defines only one mapping table for ACK/NACK channel selection per HARQ-ACK (i.e. HARQ-ACK bit) irrespective of cell configuration. That is, a mapping table is defined for each 3-bit/4-bit ACK/NACK channel selection.

FIGS. 13 and 14 show mapping tables for ACK/NACK channel selection according to an embodiment of the present invention. FIGS. 13 and 14 respectively show 3-bit and 4-bit mapping tables.

Referring to FIG. 13, HARQ-ACK(0), (1) and (2) can correspond to the following.

(1) {SDM PCell CW0, SDM PCell CW1, non-SDM SCell CW0}
(2) {SDM SCell CW0, SDM SCell CW1, non-SDM PCell CW0}
(3) {non-SDM PCell CW0, non-SDM SCell #1 CW0, non-SDM SCell #2 CW0}

Here, SDM PCell/SCell denotes a cell corresponding to 2 HARQ-ACKs and non-SDM PCell/SCell denotes a cell (group) corresponding to one HARQ-ACK for convenience. That is, SDM PCell/SCell represents an SDM cell to which spatial bundling is not applied, and non-SDM PCell/SCell represents a non-SDM cell, an SDM cell to which spatial bundling has been applied, a non-SDM SCell group to which cell bundling has been applied, and an SDM SCell group to which spatial bundling/cell bundling has been applied.

As shown in FIG. 13, the mapping table for ACK/NACK channel selection according to the present invention can be used for various cell configurations by appropriately coupling NACK and DTX. The conventional mapping table for 3-bit ACK/NACK channel selection can be applied in case of only (1) and (2). The mapping table for ACK/NACK channel selection according to an embodiment of the present invention can discriminate NACK and DTX from each other and signal the discriminated NACK and DTX to the BS by decoupling NACK and DTX or partially applying coupling for {NACK, NACK, DTX}, {NACK, DTX, DTX}, {DTX, NACK, DTX} and {DTX, DTX, DTX}. The BS can adjust a redundancy version (RV) when retransmitting a TB by discriminating NACK and DTX from each other.

Table 7 rearranges the mapping table of FIG. 13 according to the present invention.

TABLE 7

| HARQ-ACK(0) | HARQ-ACK(1) | HARQ-ACK(2) | $n_{PUCCH,i}^{(1)}$ | b(0)b(1) |
|---|---|---|---|---|
| ACK | NACK/DTX | ACK | $n_{PUCCH,1}^{(1)}$ | 1, 0 |
| NACK/DTX | ACK | ACK | $n_{PUCCH,1}^{(1)}$ | 0, 1 |
| NACK/DTX | NACK/DTX | ACK | $n_{PUCCH,2}^{(1)}$ | 1, 1 |
| ACK | ACK | NACK/DTX | $n_{PUCCH,0}^{(1)}$ | 1, 1 |
| ACK | NACK/DTX | NACK/DTX | $n_{PUCCH,0}^{(1)}$ | 1, 0 |
| NACK/DTX | ACK | NACK/DTX | $n_{PUCCH,0}^{(1)}$ | 0, 1 |
| NACK/DTX | NACK/DTX | NACK | $n_{PUCCH,2}^{(1)}$ | 0, 0 |
| NACK | NACK | DTX | $n_{PUCCH,0}^{(1)}$ | 0, 0 |
| NACK | DTX | DTX | $n_{PUCCH,0}^{(1)}$ | 0, 0 |
| DTX | NACK | DTX | $n_{PUCCH,0}^{(1)}$ | 0, 0 |
| DTX | DTX | DTX | No transmission | |

In Table 7, $n_{PUCCH,i}^{(1)}$ (i = 0, 1, 2) denotes PUCCH resource indexes corresponding to PUCCH resources #0, #1 and #2 and b(0)b(1) denotes a bit value corresponding to a complex modulated value of FIG. 13 (refer to QPSK of Table 2). $n_{PUCCH,i}^{(1)}$ (i = 0, 1, 2) may vary according to serving cell configuration. For example, in case of non-SDM PCell + SDM SCell, $n_{PUCCH,2}^{(1)}$ can be linked to a first CCE index of a CCE constituting a PDCCH corresponding to a PDSCH of the PCell (refer to Equation 1). In this case, $n_{PUCCH,i}^{(1)}$ (i = 0, 1) can be linked to the first CCE index of a CCE constituting a PDCCH corresponding to a PDSCH of the SCell or explicitly provided by a higher layer. In case of non-SDM PCell + non-SDM SCell + non-SDM SCell, $n_{PUCCH,0}^{(1)}$ can be linked to the first CCE index corresponding to the PDCCH relating to the PDSCH of the PCell. In this case, $n_{PUCCH,i}^{(1)}$ (i = 1, 2) can be linked to the first CCE index (and the second CCE index) of CCEs constituting the PDCCH relating to the PDSCH of the SCell, which correspond to HARQ-ACK(1) and (2), or explicitly provided by a higher layer. In case of SDM PCell + non-SDM SCell, $n_{PUCCH,0}^{(1)}$ and $n_{PUCCH,1}^{(1)}$ can be respectively linked to the first CCE index and the second CCE index of CCEs constituting the PDCCH corresponding to the PDSCH of the PCell. In this case, $n_{PUCCH,2}^{(1)}$ can be linked to the first CCE index of the CCE constituting the PDCCH corresponding to the PDSCH of the SCell or explicitly provided by a higher layer.

Table 8 shows states corresponding to the same PUCCH resource/bit value in Table 7.

TABLE 8

| HARQ-ACK(0) | HARQ-ACK(1) | HARQ-ACK(2) | $n_{PUCCH,i}^{(1)}$ | b(0)b(1) |
|---|---|---|---|---|
| NACK | NACK | DTX | $n_{PUCCH,0}^{(1)}$ | 0, 0 |
| NACK | DTX | DTX | $n_{PUCCH,0}^{(1)}$ | 0, 0 |
| DTX | NACK | DTX | $n_{PUCCH,0}^{(1)}$ | 0, 0 |

Since the PUCCH resources/bit values corresponding to the states in Table 8 are same, the states can be bundled. When the states of Table 8 are grouped, however, the states include a case in which HARQ-ACK(0), (1) and (2) all correspond to DTX, and thus 2 ACK/NACK states are preferably grouped. That is, {NACK, NACK, DTX}, {NACK, NACK, DTX} and {NACK, NACK, DTX} can be bundled into {NACK/DTX, NACK, DTX} and {NACK, NACK/DTX, DTX}.

Table 9 shows a case in which the states of Table 8 are bundled in Table 7.

TABLE 9

| HARQ-ACK(0) | HARQ-ACK(1) | HARQ-ACK(2) | $n_{PUCCH,i}^{(1)}$ | b(0)b(1) |
|---|---|---|---|---|
| ACK | ACK | ACK | $n_{PUCCH,1}^{(1)}$ | 1, 1 |
| ACK | NACK/DTX | ACK | $n_{PUCCH,1}^{(1)}$ | 1, 0 |
| NACK/DTX | ACK | ACK | $n_{PUCCH,1}^{(1)}$ | 0, 1 |
| NACK/DTX | NACK/DTX | ACK | $n_{PUCCH,2}^{(1)}$ | 1, 1 |
| ACK | ACK | NACK/DTX | $n_{PUCCH,0}^{(1)}$ | 1, 1 |
| ACK | NACK/DTX | NACK/DTX | $n_{PUCCH,0}^{(1)}$ | 1, 0 |
| NACK/DTX | ACK | NACK/DTX | $n_{PUCCH,0}^{(1)}$ | 0, 1 |
| NACK/DTX | NACK/DTX | NACK | $n_{PUCCH,2}^{(1)}$ | 0, 0 |
| NACK | NACK/DTX | DTX | $n_{PUCCH,0}^{(1)}$ | 0, 0 |
| NACK/DTX | NACK | DTX | $n_{PUCCH,0}^{(1)}$ | 0, 0 |
| DTX | DTX | DTX | No transmission | |

When the UE receives a PDSCH from the BS, the UE generates HARQ-ACK(0), (1) and (2) according to SDM configuration of a serving cell. The UE selects PUCCH resources (e.g. $n_{PUCCH,i}^{(1)}$) corresponding to HARQ-ACK (0), (1) and (2) and transmits bit values (or modulated values) corresponding HARQ-ACK(0), (1) and (2) through the selected PUCCH resources. PUCCH resources #0, #1 and #2 correspond to $n_{PUCCH,0}^{(1)} \sim n_{PUCCH,2}^{(1)}$.

Referring to FIG. 14, HARQ-ACK(0), (1), (2) and (3) can correspond to the following.

(1) {SDM PCell CW0, SDM PCell CW1, SDM SCell CW0, SDM SCell CW1}

(2) {SDM PCell CW0, SDM PCell CW1, non-SDM SCell CW0, non-SDM SCell CW0}

(3) {Non-SDM PCell CW0, SDM SCell #1 CW0, SDM SCell #1 CW1, non-SDM SCell #2 CW0}

(4) {Non-SDM PCell CW0, non-SDM SCell #1 CW0, SDM SCell #2 CW0, SDM SCell #2 CW1}

(5) {Non-SDM PCell CW0, non-SDM SCell #1 CW0, non-SDM SCell #2 CW0, non-SDM SCell #3 CW0}

Here, SDM PCell/SCell denotes a cell corresponding to 2 HARQ-ACKs and non-SDM PCell/SCell denotes a cell (group) corresponding to one HARQ-ACK for convenience. That is, SDM PCell/SCell represents an SDM cell to which spatial bundling is not applied, and non-SDM PCell/SCell represents a non-SDM cell, an SDM cell to which spatial bundling has been applied, a non-SDM SCell group to which cell bundling has been applied, and an SDM SCell group to which spatial bundling/cell bundling has been applied.

As shown in FIG. 14, the mapping table for ACK/NACK channel selection according to an embodiment of the present invention can be used for various cell configurations by appropriately coupling NACK and DTX. The conventional mapping table for 4-bit ACK/NACK channel selection can be applied in case of only (1). The mapping table for ACK/NACK channel selection according to an embodiment of the present invention can discriminate NACK from DTX and signal the determined NACK and DTX to the BS by decoupling NACK and DTX or partially applying coupling for {NACK, NACK, NACK/DTX, NACK/DTX}, {NACK, DTX, NACK/DTX, NACK/DTX}, {DTX, NACK, NACK/DTX, NACK/DTX} and {DTX, DTX, NACK/DTX, NACK/DTX}. The BS can adjust a redundancy version (RV) when retransmitting a TB by discriminating NACK and DTX from each other.

Table 10 rearranges the mapping table of FIG. 14 according to the present invention.

TABLE 10

| HARQ-ACK(0) | HARQ-ACK(1) | HARQ-ACK(2) | HARQ-ACK(3) | $n_{PUCCH,i}^{(1)}$ | b(0)b(1) |
|---|---|---|---|---|---|
| ACK | ACK | ACK | ACK | $n_{PUCCH,1}^{(1)}$ | 1, 1 |
| ACK | NACK/DTX | ACK | ACK | $n_{PUCCH,2}^{(1)}$ | 0, 1 |
| NACK/DTX | ACK | ACK | ACK | $n_{PUCCH,1}^{(1)}$ | 0, 1 |
| NACK/DTX | NACK/DTX | ACK | ACK | $n_{PUCCH,3}^{(1)}$ | 1, 1 |
| ACK | ACK | ACK | NACK/DTX | $n_{PUCCH,1}^{(1)}$ | 1, 0 |
| ACK | NACK/DTX | ACK | NACK/DTX | $n_{PUCCH,2}^{(1)}$ | 0, 0 |
| NACK/DTX | ACK | ACK | NACK/DTX | $n_{PUCCH,1}^{(1)}$ | 0, 0 |
| NACK/DTX | NACK/DTX | ACK | NACK/DTX | $n_{PUCCH,3}^{(1)}$ | 1, 0 |
| ACK | ACK | NACK/DTX | ACK | $n_{PUCCH,2}^{(1)}$ | 1, 1 |
| ACK | NACK/DTX | NACK/DTX | ACK | $n_{PUCCH,2}^{(1)}$ | 1, 0 |
| NACK/DTX | ACK | NACK/DTX | ACK | $n_{PUCCH,3}^{(1)}$ | 0, 1 |

TABLE 10-continued

| HARQ-ACK(0) | HARQ-ACK(1) | HARQ-ACK(2) | HARQ-ACK(3) | $n_{PUCCH,i}^{(1)}$ | b(0)b(1) |
|---|---|---|---|---|---|
| NACK/DTX | NACK/DTX | NACK/DTX | ACK | $n_{PUCCH,3}^{(1)}$ | 0, 0 |
| ACK | ACK | NACK/DTX | NACK/DTX | $n_{PUCCH,0}^{(1)}$ | 1, 1 |
| ACK | NACK/DTX | NACK/DTX | NACK/DTX | $n_{PUCCH,0}^{(1)}$ | 1, 0 |
| NACK/DTX | ACK | NACK/DTX | NACK/DTX | $n_{PUCCH,0}^{(1)}$ | 0, 1 |
| NACK | DTX | NACK/DTX | NACK/DTX | $n_{PUCCH,0}^{(1)}$ | 0, 0 |
| DTX | NACK | NACK/DTX | NACK/DTX | $n_{PUCCH,0}^{(1)}$ | 0, 0 |
| NACK | NACK | NACK/DTX | NACK/DTX | $n_{PUCCH,0}^{(1)}$ | 0, 0 |
| DTX | DTX | NACK/DTX | NACK/DTX | No transmission | |

In Table 10, $n_{PUCCH,i}^{(1)}$ (i = 0, 1, 2, 3) denotes PUCCH resource indexes corresponding to PUCCH resources #0, #1, #2 and #3 and b(0)b(1) denotes a bit value corresponding to a complex modulated value of FIG. 14 (refer to QPSK of Table 2). $n_{PUCCH,i}^{(1)}$ (i = 0, 1, 2, 3) may vary according to serving cell configuration. For example, when the PCell is set to a transmission mode supporting transmission of a single TB, $n_{PUCCH,0}^{(1)}$ can be linked to a first CCE index of a CCE constituting a PDCCH corresponding to a PDSCH of the PCell (refer to Equation 1). In this case, $n_{PUCCH,i}^{(1)}$ (i = 1, 2, 3) can be linked to a first CCE index (and a second CCE index) of a CCE constituting PDCCH(s) corresponding to PDSCH(s) of the SCell, which correspond to HARQ-ACK(1), (2) and (3), or explicitly provided by a higher layer. If the PCell is set to a transmission mode supporting transmission of 2 TBs, $n_{PUCCH,0}^{(1)}$ and $n_{PUCCH,1}^{(1)}$ can be respectively linked to the first CCE index and the second CCE index of CCEs constituting the PDCCH corresponding to the PDSCH of the PCell. In this case, $n_{PUCCH,2}^{(1)}$ and $n_{PUCCH,3}^{(1)}$ can be linked to the first CCE index of the CCE constituting the PDCCH(s) relating to the PDSCH(s) of the SCell, which correspond to HARQ-ACK(2) and (3), or explicitly provided by a higher layer.

Table 11 shows states corresponding to the same PUCCH resource/bit value in Table 10.

TABLE 11

| HARQ-ACK(0) | HARQ-ACK(1) | HARQ-ACK(2) | HARQ-ACK(3) | $n_{PUCCH,i}^{(1)}$ | b(0)b(1) |
|---|---|---|---|---|---|
| NACK | DTX | NACK/DTX | NACK/DTX | $n_{PUCCH,0}^{(1)}$ | 0, 0 |
| DTX | NACK | NACK/DTX | NACK/DTX | $n_{PUCCH,0}^{(1)}$ | 0, 0 |
| NACK | NACK | NACK/DTX | NACK/DTX | $n_{PUCCH,0}^{(1)}$ | 0, 0 |

Since the PUCCH resources/bit values corresponding to the states in Table 11 are same, the states can be bundled. When the states of Table 11 are grouped into one, however, the states include a case in which HARQ-ACK(0), (1) and (2) all correspond to DTX, and thus 2 ACK/NACK states are preferably grouped. That is, {NACK, NACK, DTX}, {NACK, NACK, DTX} and {NACK, NACK, DTX} can be bundled into {NACK/DTX, NACK, DTX} and {NACK, NACK/DTX, DTX}.

Table 12 shows a case in which the states of Table 11 are bundled in Table 10.

TABLE 12

| HARQ-ACK(0) | HARQ-ACK(1) | HARQ-ACK(2) | HARQ-ACK(3) | $n_{PUCCH,i}^{(1)}$ | b(0)b(1) |
|---|---|---|---|---|---|
| ACK | ACK | ACK | ACK | $n_{PUCCH,1}^{(1)}$ | 1, 1 |
| ACK | NACK/DTX | ACK | ACK | $n_{PUCCH,2}^{(1)}$ | 0, 1 |
| NACK/DTX | ACK | ACK | ACK | $n_{PUCCH,1}^{(1)}$ | 0, 1 |
| NACK/DTX | NACK/DTX | ACK | ACK | $n_{PUCCH,3}^{(1)}$ | 1, 1 |
| ACK | ACK | ACK | NACK/DTX | $n_{PUCCH,1}^{(1)}$ | 1, 0 |
| ACK | NACK/DTX | ACK | NACK/DTX | $n_{PUCCH,2}^{(1)}$ | 0, 0 |
| NACK/DTX | ACK | ACK | NACK/DTX, | $n_{PUCCH,1}^{(1)}$ | 0, 0 |
| NACK/DTX | NACK/DTX | ACK | NACK/DTX | $n_{PUCCH,3}^{(1)}$ | 1, 0 |
| ACK | ACK | NACK/DTX | ACK | $n_{PUCCH,2}^{(1)}$ | 1, 1 |
| ACK | NACK/DTX | NACK/DTX | ACK | $n_{PUCCH,2}^{(1)}$ | 1, 0 |
| NACK/DTX | ACK | NACK/DTX | ACK | $n_{PUCCH,3}^{(1)}$ | 0, 1 |

TABLE 12-continued

| HARQ-ACK(0) | HARQ-ACK(1) | HARQ-ACK(2) | HARQ-ACK(3) | $n_{PUCCH,i}^{(1)}$ | b(0)b(1) |
|---|---|---|---|---|---|
| NACK/DTX | NACK/DTX | NACK/DTX | ACK | $n_{PUCCH,3}^{(1)}$ | 0, 0 |
| ACK | ACK | NACK/DTX | NACK/DTX | $n_{PUCCH,0}^{(1)}$ | 1, 1 |
| ACK | NACK/DTX | NACK/DTX | NACK/DTX | $n_{PUCCH,0}^{(1)}$ | 1, 0 |
| NACK/DTX | ACK | NACK/DTX | NACK/DTX | $n_{PUCCH,0}^{(1)}$ | 0, 1 |
| NACK/DTX | NACK | NACK/DTX | NACK/DTX | $n_{PUCCH,0}^{(1)}$ | 0, 0 |
| NACK | NACK/DTX | NACK/DTX | NACK/DTX | $n_{PUCCH,0}^{(1)}$ | 0, 0 |
| DTX | DTX | NACK/DTX | NACK/DTX | No transmission | |

When the UE receives a PDSCH from the BS, the UE generates HARQ-ACK(0), (1), (2) and (3) according to SDM configuration of a serving cell. The UE selects PUCCH resources (e.g. $n_{PUCCH,i}^{(1)}$) corresponding to HARQ-ACK(0), (1), (2) and (3) and transmits bit values (or modulated values) corresponding HARQ-ACK(0), (1), (2) and (3) through the selected PUCCH resources. PUCCH resources #0 to #3 correspond to $n_{PUCCH,0}^{(1)} \sim n_{PUCCH,3}^{(1)}$.

Figure 15:
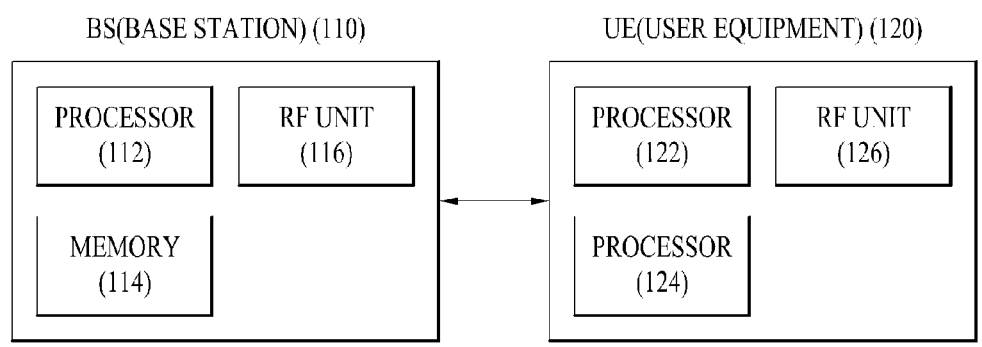
FIG. 15 illustrates a base station (BS) and a user equipment (UE) applicable to an embodiment of the present invention.

FIG. 15 illustrates a BS and a UE applicable to an embodiment of the present invention. When a wireless communication system includes a relay, communication is performed between a BS and the relay on a backhaul link and between the relay and a UE on an access link. The BS or UE shown in FIG. 16 can be replaced by a relay as necessary.

Referring to FIG. 15, an RF communication system includes a BS 110 and a UE 120. The BS 110 includes a processor 112, a memory 114 and an RF unit 116. The processor 112 may be configured to implement the procedures and/or methods proposed by the present invention. The memory 114 is connected to the processor 112 and stores various types of information relating to operations of the processor 112. The RF unit 116 is connected to the processor 112 and transmits and/or receives RF signals. The UE 120 includes a processor 122, a memory 124 and an RF unit 126. The processor 122 may be configured to implement the procedures and/or methods proposed by the present invention. The memory 124 is connected to the processor 122 and stores various types of information relating to operations of the processor 122. The RF unit 126 is connected to the processor 122 and transmits and/or receives RF signals. The BS 110 and the UE 120 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to wireless communication apparatuses such as a UE, a relay, a BS, etc.

The invention claimed is:
1. A method for a communication apparatus to transmit control information using an Acknowledgement/Negative Acknowledgement (AN) channel selection scheme, the method comprising:
   transmitting two bits via a Physical Uplink Control Channel (PUCCH) resource based on an identified AN state set and a mapping rule of Table 1 below,
   wherein the identified AN set including Hybrid Automatic Repeat reQuest Acknowledgement (HARQ-ACK)(0), HARQ-ACK(1), HARQ-ACK(2) and HARQ-ACK(3) for multiple cells including a Primary Cell (PCell) and one or more Secondary Cells (SCells), and the multiple cells consists of 2 to 4 cells,

TABLE 1

| HARQ-ACK(0) | HARQ-ACK(1) | HARQ-ACK(2) | HARQ-ACK(3) | PUCCH resource | two bits |
|---|---|---|---|---|---|
| ACK | ACK | ACK | ACK | $2^{nd}$ PUCCH resource | 1, 1 |

TABLE 1-continued

| HARQ-ACK(0) | HARQ-ACK(1) | HARQ-ACK(2) | HARQ-ACK(3) | PUCCH resource | two bits |
|---|---|---|---|---|---|
| ACK | NACK/DTX | ACK | ACK | 3$^{rd}$ PUCCH resource | 0, 1 |
| NACK/DTX | ACK | ACK | ACK | 2$^{nd}$ PUCCH resource | 0, 1 |
| NACK/DTX | NACK/DTX | ACK | ACK | 4$^{th}$ PUCCH resource | 1, 1 |
| ACK | ACK | ACK | NACK/DTX | 2$^{nd}$ PUCCH resource | 1, 0 |
| ACK | NACK/DTX | ACK | NACK/DTX | 3$^{rd}$ PUCCH resource | 0, 0 |
| NACK/DTX | ACK | ACK | NACK/DTX | 2$^{nd}$ PUCCH resource | 0, 0 |
| NACK/DTX | NACK/DTX | ACK | NACK/DTX | 4$^{th}$ PUCCH resource | 1, 0 |
| ACK | ACK | NACK/DTX | ACK | 3$^{rd}$ PUCCH resource | 1, 1 |
| ACK | NACK/DTX | NACK/DTX | ACK | 3$^{rd}$ PUCCH resource | 1, 0 |
| NACK/DTX | ACK | NACK/DTX | ACK | 4$^{th}$ PUCCH resource | 0, 1 |
| NACK/DTX | NACK/DTX | NACK/DTX | ACK | 4$^{th}$ PUCCH resource | 0, 0 |
| ACK | ACK | NACK/DTX | NACK/DTX | 1$^{st}$ PUCCH resource | 1, 1 |
| ACK | NACK/DTX | NACK/DTX | NACK/DTX | 1$^{st}$ PUCCH resource | 1, 0 |
| NACK/DTX | ACK | NACK/DTX | NACK/DTX | 1$^{st}$ PUCCH resource | 0, 1 |
| NACK/DTX | NACK | NACK/DTX | NACK/DTX | 1$^{st}$ PUCCH resource | 0, 0 |
| NACK | NACK/DTX | NACK/DTX | NACK/DTX | 1$^{st}$ PUCCH resource | 0, 0 |
| DTX | DTX | NACK/DTX | NACK/DTX | No transmission | | wherein ACK represents a positive acknowledgement, NACK represents a negative acknowledgement, DTX represents a discontinuous transmission, and NACK/DTX represents NACK or DTX.

2. A method for a communication apparatus to transmit control information using an Acknowledgement/Negative Acknowledgement (AN) channel selection scheme, the method comprising:

transmitting two bits via a Physical Uplink Control Channel (PUCCH) resource based on an identified AN state set and a mapping rule of Table 2 below, wherein the identified AN set including Hybrid Automatic Repeat reQuest Acknowledgement (HARQ-ACK)(0), HARQ-ACK(1) and HARQ-ACK(2) for multiple cells including a Primary Cell (PCell) and one or more Secondary Cells (SCells), and the multiple cells consists of 2 to 3 cells,

TABLE 2

| HARQ-ACK(0) | HARQ-ACK(1) | HARQ-ACK(2) | PUCCH resource | two bits |
|---|---|---|---|---|
| ACK | ACK | ACK | 2$^{nd}$ PUCCH resource | 1, 1 |
| ACK | NACK/DTX | ACK | 2$^{nd}$ PUCCH resource | 1, 0 |
| NACK/DTX | ACK | ACK | 2$^{nd}$ PUCCH resource | 0, 1 |
| NACK/DTX | NACK/DTX | ACK | 3$^{rd}$ PUCCH resource | 1, 1 |
| ACK | ACK | NACK/DTX | 1$^{st}$ PUCCH resource | 1, 1 |
| ACK | NACK/DTX | NACK/DTX | 1$^{st}$ PUCCH resource | 1, 0 |
| NACK/DTX | ACK | NACK/DTX | 1$^{st}$ PUCCH resource | 0, 1 |
| NACK/DTX | NACK/DTX | NACK | 3$^{rd}$ PUCCH resource | 0, 0 |

TABLE 2-continued

| HARQ-ACK(0) | HARQ-ACK(1) | HARQ-ACK(2) | PUCCH resource | two bits |
|---|---|---|---|---|
| NACK | NACK/DTX | DTX | 1$^{st}$ PUCCH resource | 0, 0 |
| NACK/DTX | NACK | DTX | 1$^{st}$ PUCCH resource | 0, 0 |
| DTX | DTX | DTX | No transmission | | wherein ACK represents a positive acknowledgement, NACK represents a negative acknowledgement, DTX represents a discontinuous transmission, and NACK/DTX represents NACK or DTX.

3. A communication apparatus configured to transmit control information using an Acknowledgement/Negative Acknowledgement (AN) channel selection scheme, the communication apparatus comprising:

an Radio Frequency (RF) unit; and a processor operatively connected to the RF unit and configured to:

transmit two bits via a Physical Uplink Control Channel (PUCCH) resource based on an identified AN state set and a mapping rule of Table 1 below, wherein the identified AN set including Hybrid Automatic Repeat reQuest Acknowledgement (HARQ-ACK)(0), HARQ-ACK)(1), HARQ-ACK)(2) and HARQ-ACK)(3) for a Primary Cell (PCell) and one or more Secondary Cells (SCells), and the multiple cells consists of 2 to 4 cells,

TABLE 1

| HARQ-ACK(0) | HARQ-ACK(1) | HARQ-ACK(2) | HARQ-ACK(3) | PUCCH resource | two bits |
|---|---|---|---|---|---|
| ACK | ACK | ACK | ACK | 2$^{nd}$ PUCCH resource | 1, 1 |
| ACK | NACK/DTX | ACK | ACK | 3$^{rd}$ PUCCH resource | 0, 1 |
| NACK/DTX | ACK | ACK | ACK | 2$^{nd}$ PUCCH resource | 0, 1 |
| NACK/DTX | NACK/DTX | ACK | ACK | 4$^{th}$ PUCCH resource | 1, 1 |
| ACK | ACK | ACK | NACK/DTX | 2$^{nd}$ PUCCH resource | 1, 0 |
| ACK | NACK/DTX | ACK | NACK/DTX | 3$^{rd}$ PUCCH resource | 0, 0 |
| NACK/DTX | ACK | ACK | NACK/DTX | 2$^{nd}$ PUCCH resource | 0, 0 |
| NACK/DTX | NACK/DTX | ACK | NACK/DTX | 4$^{th}$ PUCCH resource | 1, 0 |
| ACK | ACK | NACK/DTX | ACK | 3$^{rd}$ PUCCH resource | 1, 1 |
| ACK | NACK/DTX | NACK/DTX | ACK | 3$^{rd}$ PUCCH resource | 1, 0 |
| NACK/DTX | ACK | NACK/DTX | ACK | 4$^{th}$ PUCCH resource | 0, 1 |
| NACK/DTX | NACK/DTX | NACK/DTX | ACK | 4$^{th}$ PUCCH resource | 0, 0 |
| ACK | ACK | NACK/DTX | NACK/DTX | 1$^{st}$ PUCCH resource | 1, 1 |
| ACK | NACK/DTX | NACK/DTX | NACK/DTX | 1$^{st}$ PUCCH resource | 1, 0 |
| NACK/DTX | ACK | NACK/DTX | NACK/DTX | 1$^{st}$ PUCCH resource | 0, 1 |
| NACK/DTX | NACK | NACK/DTX | NACK/DTX | 1$^{st}$ PUCCH resource | 0, 0 |
| NACK | NACK/DTX | NACK/DTX | NACK/DTX | 1$^{st}$ PUCCH resource | 0, 0 |
| DTX | DTX | NACK/DTX | NACK/DTX | No transmission | | wherein ACK represents a positive acknowledgement, NACK represents a negative acknowledgement, DTX represents a discontinuous transmission, and NACK/DTX represents NACK or DTX.

4. A communication apparatus configured to transmit control information using an Acknowledgement/Negative Acknowledgement (AN) channel selection scheme, the communication apparatus comprising:

an Radio Frequency (RF) unit; and
a processor operatively connected to the RF unit and configured to:
  transmit two bits via a Physical Uplink Control Channel (PUCCH) resource based on an identified AN state set and a mapping rule of Table 2 below,
  wherein the identified AN set including Hybrid Automatic Repeat reQuest Acknowledgement (HARQ-ACK)(0), HARQ-ACK)(1) and HARQ-ACK)(2) for multiple cells including a Primary Cell (PCell) and one or more Secondary Cells (SCells), and the multiple cells consists of 2 to 3 cells,

TABLE 2

| HARQ-ACK(0) | HARQ-ACK(1) | HARQ-ACK(2) | PUCCH resource | two bits |
|---|---|---|---|---|
| ACK | ACK | ACK | $2^{nd}$ PUCCH resource | 1, 1 |
| ACK | NACK/DTX | ACK | $2^{nd}$ PUCCH resource | 1, 0 |
| NACK/DTX | ACK | ACK | $2^{nd}$ PUCCH resource | 0, 1 |
| NACK/DTX | NACK/DTX | ACK | $3^{rd}$ PUCCH resource | 1, 1 |
| ACK | ACK | NACK/DTX | $1^{st}$ PUCCH resource | 1, 1 |
| ACK | NACK/DTX | NACK/DTX | $1^{st}$ PUCCH resource | 1, 0 |
| NACK/DTX | ACK | NACK/DTX | $1^{st}$ PUCCH resource | 0, 1 |
| NACK/DTX | NACK/DTX | NACK | $3^{rd}$ PUCCH resource | 0, 0 |
| NACK | NACK/DTX | DTX | $1^{st}$ PUCCH resource | 0, 0 |
| NACK/DTX | NACK | DTX | $1^{st}$ PUCCH resource | 0, 0 |
| DTX | DTX | DTX | No transmission | | wherein ACK represents a positive acknowledgement, NACK represents a negative acknowledgement, DTX represents a discontinuous transmission, and NACK/DTX represents NACK or DTX.

* * * * *

UNITED STATES PATENT AND TRADEMARK OFFICE
CERTIFICATE OF CORRECTION

PATENT NO. : 9,491,743 B2
APPLICATION NO. : 13/878970
DATED : November 8, 2016
INVENTOR(S) : Suckchel Yang et al.

It is certified that error appears in the above-identified patent and that said Letters Patent is hereby corrected as shown below:

In the Specification

In Column 19, Line 30:
Delete "FIG. 16" and insert --FIG. 15--

Signed and Sealed this
Fourteenth Day of April, 2020

Andrei Iancu
*Director of the United States Patent and Trademark Office*